US012567248B2

(12) United States Patent
Wright et al.

(10) Patent No.: US 12,567,248 B2
(45) Date of Patent: Mar. 3, 2026

(54) CROP SCANNING SYSTEM, PARTS THEREOF, AND ASSOCIATED METHODS

(71) Applicant: B-HIVE INNOVATIONS LIMITED, Lincolnshire (GB)

(72) Inventors: Alison Wright, Lincoln (GB); Vidyanath Gururajan, Lincoln (GB); Richard Green, Lincoln (GB)

(73) Assignee: B-HIVE INNOVATIONS LIMITED, Lincolnshire (GB)

( * ) Notice: Subject to any disclaimer, the term of this patent is extended or adjusted under 35 U.S.C. 154(b) by 346 days.

(21) Appl. No.: 18/028,408

(22) PCT Filed: Sep. 24, 2021

(86) PCT No.: PCT/GB2021/052494
§ 371 (c)(1),
(2) Date: Mar. 24, 2023

(87) PCT Pub. No.: WO2022/064215
PCT Pub. Date: Mar. 31, 2022

(65) Prior Publication Data
US 2023/0368525 A1 Nov. 16, 2023

(30) Foreign Application Priority Data

Sep. 25, 2020 (GB) ..................................... 2015219

(51) Int. Cl.
*G06V 20/10* (2022.01)
*A01D 41/127* (2006.01)
*G06V 20/68* (2022.01)

(52) U.S. Cl.
CPC ......... *G06V 20/188* (2022.01); *A01D 41/127* (2013.01); *G06V 20/68* (2022.01); *G06T 2207/30188* (2013.01)

(58) Field of Classification Search
None
See application file for complete search history.

(56) References Cited

U.S. PATENT DOCUMENTS

| | | | |
|---|---|---|---|
| 10,830,751 B2 | 11/2020 | Pickett et al. | |
| 2017/0336507 A1 * | 11/2017 | Chan | B64D 43/00 |
| 2019/0124826 A1 * | 5/2019 | Pickett | A01C 23/02 |

FOREIGN PATENT DOCUMENTS

| | | | | |
|---|---|---|---|---|
| DE | 112012003842 T5 * | 7/2014 | .......... | C07K 14/415 |
| DE | 102013010491 A1 | 8/2014 | | |

(Continued)

OTHER PUBLICATIONS

Translation for reference DE—112012003842 T5 (Year: 2014).*

(Continued)

*Primary Examiner* — Vikkram Bali
(74) *Attorney, Agent, or Firm* — Price Heneveld LLP

(57) ABSTRACT

A crop scanning system for determining a parameter associated with a plurality of harvestable items of a crop, the harvestable items being beneath a ground surface, the crop scanning system including: a scanning head assembly including at least one scanning device configured to perform a scanning operation in relation to the harvestable items, the scanning device being configured to emit a ground penetrating radar signal or pulse and to generate scan data including a representation of the harvestable items; an imaging system configured to capture an image of a part of the crop which is above the ground surface and to generate image data including a representation of one or more stems associated with the harvestable items; and an analysis system configured to use the scan data and the image data to determine the parameter associated with the harvestable items, wherein the at least one parameter includes a predicted size of the harvestable items.

18 Claims, 24 Drawing Sheets

(56) References Cited

FOREIGN PATENT DOCUMENTS

| EP | 3476216 | A1 | 5/2019 |
| EP | 3482619 | A1 | 5/2019 |
| WO | 2010063075 | A1 | 6/2010 |
| WO | 2020037003 | A1 | 2/2020 |
| WO | 2022064245 | A1 | 3/2022 |

OTHER PUBLICATIONS

Examination Report, Application No. GB2015219.5, Jan. 30, 2024, 3 pages.
International Search Report, Application No. PCT/GB2021/052494, Jan. 4, 2022, 3 pages.

\* cited by examiner

CROP SCANNING SYSTEM, PARTS THEREOF, AND ASSOCIATED METHODS

CROSS-REFERENCE TO RELATED APPLICATIONS

This application claims priority to International Application No. PCT/GB2021/052494, filed on Sep. 24, 2021, entitled "A CROP SCANNING SYSTEM, PARTS THEREOF, AND ASSOCIATED METHODS," which claims the benefit of United Kingdom Patent Application GB 2015219.5, filed on Sep. 25, 2020, entitled "A CROP SCANNING SYSTEM, PARTS THEREOF, AND ASSO-CIATED METHODS," the disclosures of which are all hereby incorporated herein by reference in their entirety.

BACKGROUND

Embodiments relate to systems and methods for deter-mining one or more parameters associated with an agricul-tural crop.

It is important for farmers, for example, to identify one or more parameters associated with agricultural crops. These parameters may include the volume of the crop likely to be harvested and/or the size of individual harvestable items of the crop. This information enables, for example, the selec-tive harvesting of the crop to meet particular needs, better matching of a buyer's needs to the crop harvested, and the timing of the harvesting to provide a crop which better matches a particular requirement.

This information can be useful in advance of harvesting the crop (for use generally associated with the harvesting process) but can also be useful in steering supportive actions taken by a farmer prior to harvesting. Such supportive actions may include, for example, the use of fertiliser, pesticides, fungicides, and/or water, and/or the cutting back of foliage associated with the crop. Again, the use of such supportive actions may ultimately mean that the crop is better matched to buyer needs, has a higher quality, and/or is more valuable.

With a crop which is generally grown above the ground, determining one or more parameters of crop may include a visual analysis of one or more samples of the crop in-place and/or the harvesting of one or more samples for remote analysis. Whilst there are inevitably generalisations and, therefore, inaccuracies in this process, it is often possible to identify parts of the crop in-place which appear to be misaligned with the parameters of the samples taken—as the crop is above the ground and visual inspections are more readily practical to perform.

In some instances, an above ground crop can be analysed as a whole, rather than taking samples and making gener-alisations—as the crop is above the ground it may not be necessary to harvest the crop or samples thereof to perform this analysis.

A more significant issue arises with such sample-based crop analysis processes when the crop is generally grown underground—such as tubers and other root crops. Crops which are generally grown underground include, for example, potatoes, sweet potatoes, carrots, beets, radishes, turnips, onions, and the like.

Analysis of such crops is also possible on a sample-basis. However, there is greater inaccuracy in such analysis because it is not possible to determine whether or not the samples are likely to be representative of the properties of the crop as a whole. Nor is it possible to perform analysis of the entire crop without first harvesting the crop, as it is hidden from view.

For example, HarvestEye™ from B-Hive Innovations Limited, UK, is a system for analysing a crop as it is being harvested. Whilst this is an innovative advance, the system does not provide information about the crop prior to har-vesting.

Therefore, there is a need to provide improved crop analysis methods and equipment, particularly for crops which are grown underground and which are, therefore, not readily available for visual inspection.

Embodiments of the present invention seek to alleviate one or more problems associated with the prior art.

BRIEF SUMMARY

An aspect provides a crop scanning system for determin-ing a parameter associated with a plurality of harvestable items of a crop, the harvestable items being beneath a ground surface, the crop scanning system including: a scan-ning head assembly including at least one scanning device configured to perform a scanning operation in relation to the harvestable items, the scanning device being configured to emit a ground penetrating radar signal or pulse and to generate scan data including a representation of the harvest-able items; an imaging system configured to capture an image of a part of the crop which is above the ground surface and to generate image data including a representation of one or more stems and/or meristems associated with the har-vestable items; and an analysis system configured to use the scan data and the image data to determine the parameter associated with the harvestable items, wherein the at least one parameter includes a predicted size of the harvestable items.

The use of the scan data and the image data may include use of the scan data to determine a total size for the harvestable items.

Use of the scan data and the image data may include use of the image data to determine a number of stems and/or meristems associated with the harvestable items, and use of the number of stems and/or meristems to determine the number of harvestable items.

Use of the image data to determine a number of stems and/or meristems may be use of the image data to determine a number of meristems.

The use of the scan data and the image data may include use of the scan data to determine a total size for the harvestable items, and wherein the analysis system may be further configured to divide the total size for the harvestable items by the number of harvestable items to generate the predicted size of the harvestable items.

The image data and the scan data may each associated with respective geographic location information, and the analysis system may be further configured to align the image data with the scan data based on the geographic location information associated with each of the image data and the scan data.

The imaging system may include one or more imaging devices, and the or each imagining device may include a visible light camera.

The analysis system may be configured to use image data in the form of a blue light image of the part of the crop.

The scanning head assembly may be mounted to a vehicle which has one or more ground engaging wheels, tracks, or skids.

The imaging system and scanning head assembly may be carried by the same vehicle.

The analysis system may be remote from the scanning head assembly and the imaging system.

The analysis system may be carried by the vehicle.

The imaging system may be configured to generate the image data at substantially the same time the scanning head assembly is configured to generate the scan data.

A system may further include a user interface device which is configured to display the at least one parameter to the user.

A system may further include an automated operation system which is configured to perform an automated operation or to instruct the performance of an operation in relation to the crop based on the at least one parameter.

Another aspect provides a crop scanning method for determining a parameter associated with a plurality of harvestable items of a crop, the harvestable items being beneath a ground surface, the crop scanning method including: performing a scanning operation in relation to the harvestable items, including emitting a ground penetrating radar signal or pulse and generating scan data including a representation of the harvestable items; receiving an image of a part of the crop which is above the ground surface and generating image data including a representation of one or more stems and/or meristems associated with the harvestable items; and using the scan data and the image data to determine the parameter associated with the harvestable items, wherein the at least one parameter includes a predicted size of the harvestable items.

The use of the scan data and the image data may include use of the scan data to determine a total size for the harvestable items.

Use of the scan data and the image data may include use of the image data to determine a number of stems and/or meristems associated with the harvestable items, and use of the number of stems and/or meristems to determine the number of harvestable items.

Use of the image data to determine a number of stems and/or meristems may be use of the image data to determine a number of meristems.

The use of the scan data and the image data may include use of the scan data to determine a total size for the harvestable items, and wherein determining the parameter may further include dividing the total size for the harvestable items by the number of harvestable items to generate the predicted size of the harvestable items.

The image data and the scan data may each associated with respective geographic location information, and the method may further include aligning the image data with the scan data based on the geographic location information associated with each of the image data and the scan data.

The image data may be visible light image data.

Use of the scan data and image data may include use of the image data in the form of a blue light image of the part of the crop.

A method may further include providing an analysis system configured to determine the parameter, wherein the analysis system is remote from the crop.

The analysis system may be carried by a vehicle.

The image data may be generated at substantially the same time as the scan data.

A method may further include displaying the at least one parameter to the user.

A method may further include performing an automated operation or instructing the performance of an operation in relation to the crop based on the at least one parameter.

A method may further include mounting a scanning head assembly to a vehicle which has one or more ground engaging wheels, tracks, or skids, wherein the scanning head assembly is configured to perform the scanning operation.

A method may further include providing an imaging system to capture the image data and a scanning head assembly for performing the scanning operation, wherein the imaging system and the scanning head assembly are carried by the same vehicle.

Another aspect provides a computer readable medium having stored thereon instructions which, when executed by a processor, cause the operation of the method as above.

BRIEF DESCRIPTION OF THE DRAWINGS

Embodiments are described, by way of example only, with reference to the accompanying drawings, in which.

DETAILED DESCRIPTION

Figure 1:
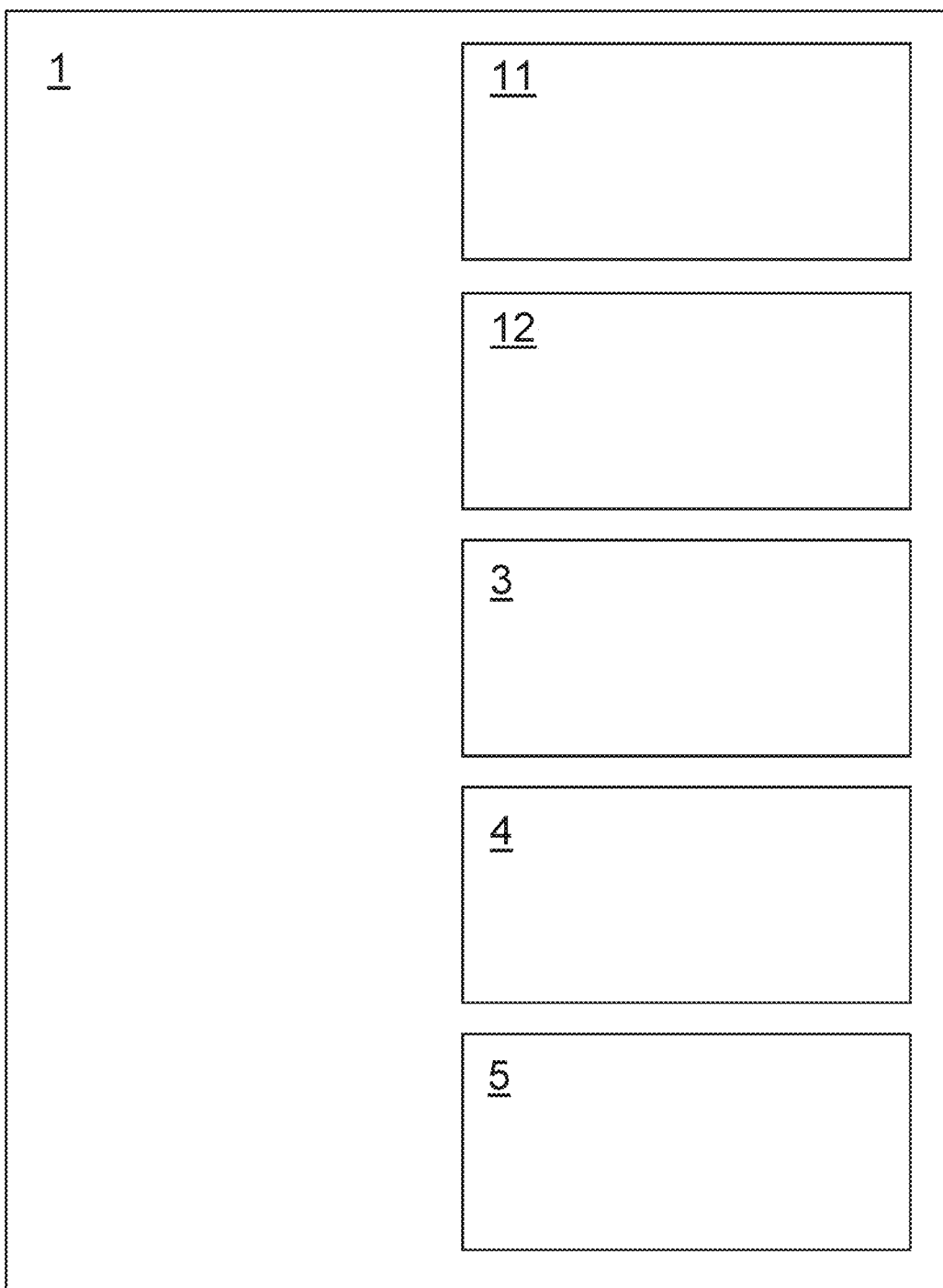
FIG. 1 shows a schematic representation of a crop scanning system of some embodiments.
Figure 3:
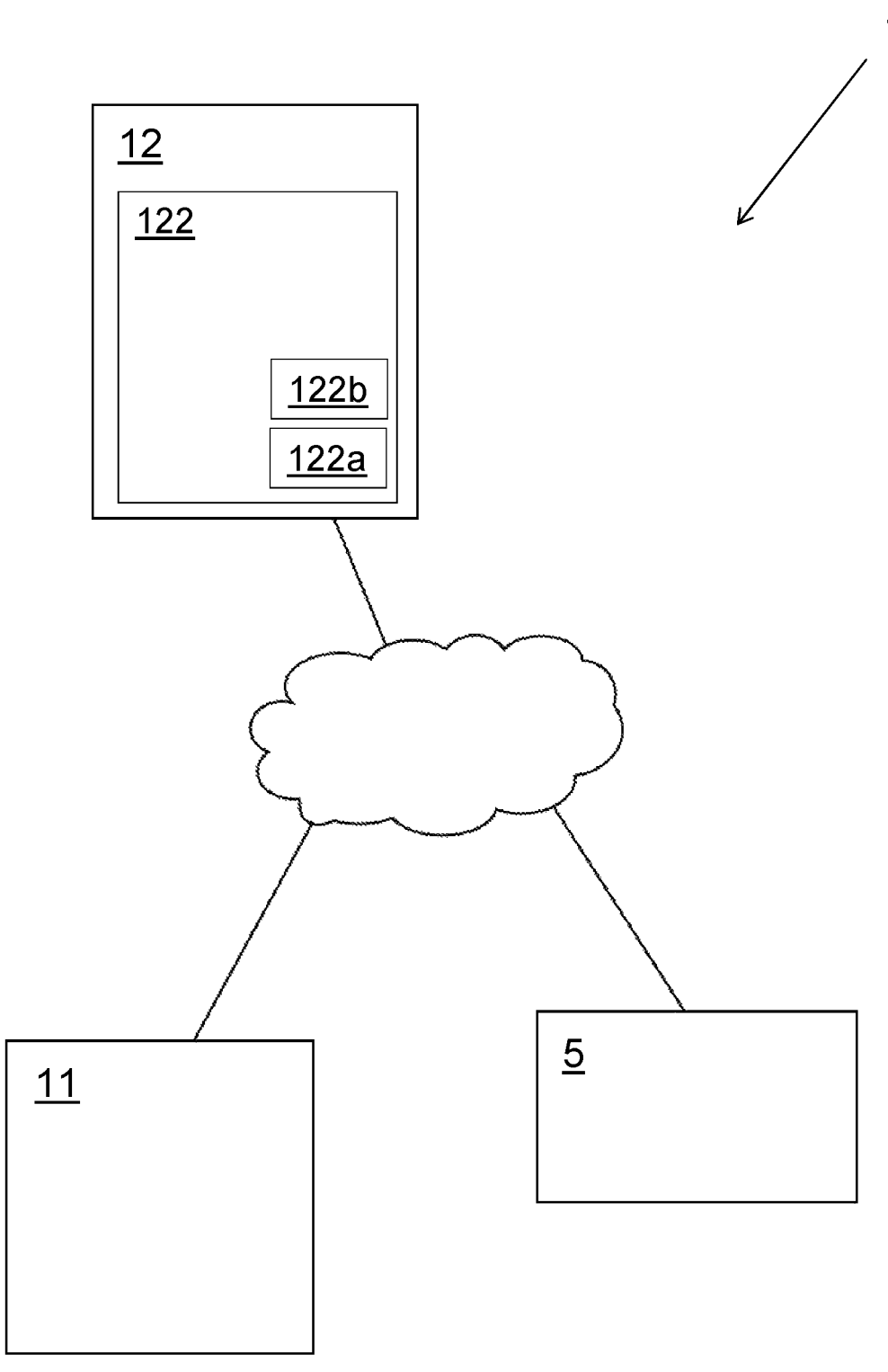
FIG. 3 shows another schematic representation of a crop scanning system of some embodiments.

Embodiments include a crop scanning system 1, see FIGS. 1 and 3 for example, for performing a scanning operation on an agricultural crop to generate data which may be used to determine one or more parameters associated with the crop. The crop scanning system 1 is configured to perform the scanning operation on a crop in-place (i.e. in situ) without having first harvested the crop.

The crop may be a crop which is generally grown underground (i.e. the part of the crop which is of primary value is underneath the ground, although foliage may be located above the ground and it may be that the foliage is also harvested as a secondary crop—e.g. for animal feed or the like). The crop may include one or more harvestable items and these items may be the part of the crop which is of primary value, for example.

The crop could be, for example, a root vegetable crop (i.e. the harvestable item is a root vegetable). The crop could be a crop of tubers. The crop may be of potatoes, sweet potatoes, onions, beets, carrots, radishes, turnips, or the like. Embodiments will, however, be described with reference specifically to the crop being potatoes. Nevertheless it will be understood that this is an illustrative, non-limiting, example only and that the same or similar systems and methods may be applied in relation to other crops.

Figure 2:
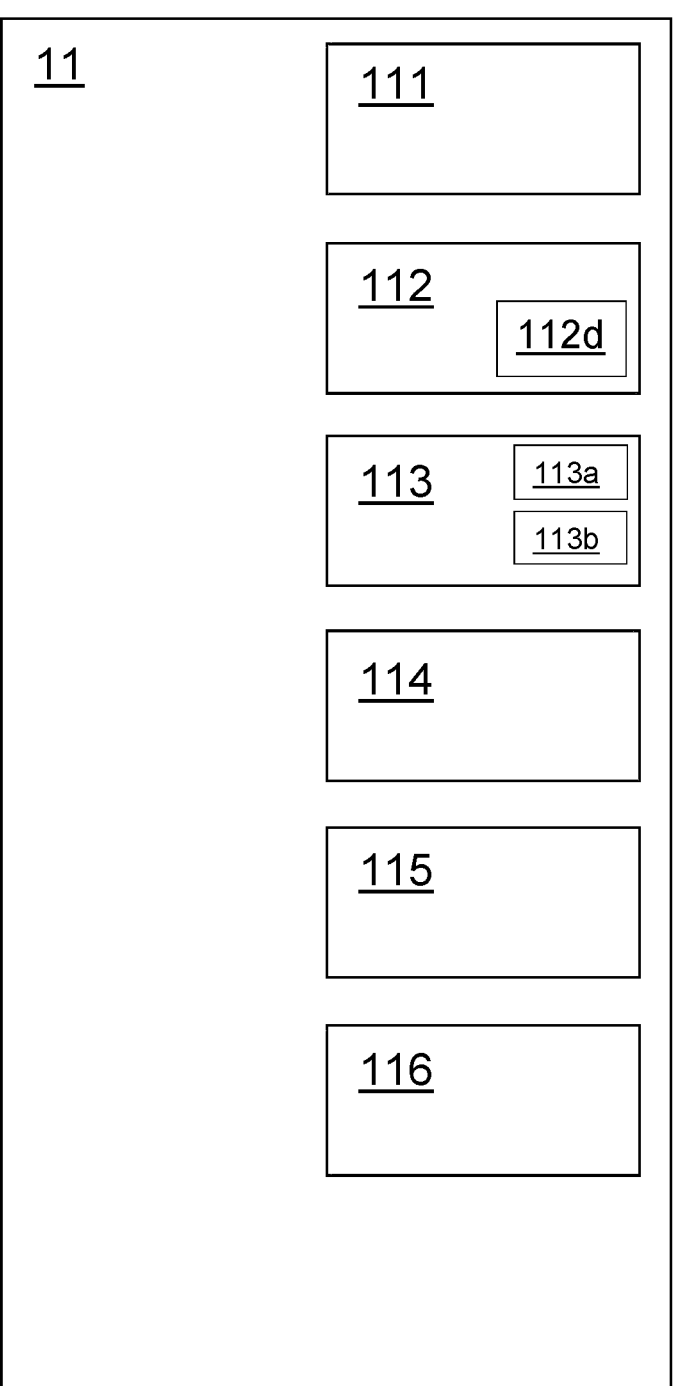
FIG. 2 shows a schematic representation of a scanning head assembly of some embodiments.

The crop scanning system 1 may include a scanning head assembly 11—see FIGS. 1, 2, and 3, for example. The scanning head assembly 11 includes one or more scanning devices 111—see FIGS. 4-6 and 9-11, for example. The or each scanning device 111 is configured to emit a signal and to receive a reflected signal. The signal may be is signal in the electromagnetic spectrum and may be a radar signal. The radar signal may be an electromagnetic signal in the frequency range of about 10 MHz to about 6 GHz, and may be a ground penetrating radar electromagnetic signal. The radar signal may be an electromagnetic signal in the frequency range of about 30 MHz to about 6 GHz.

In some embodiments, the or each scanning device 111 includes one or more signal emitters (which may be an array of emitters) and one or more signal receivers (which may be an array of receivers). However, in some embodiments, there are a plurality of scanning devices 111 wherein a first of the plurality of scanning devices 111 includes one or more emitters (which may be array of emitters) and a second of the plurality of scanning devices 111 includes one or more receivers (which may be an array of receivers). In some such embodiments, the first scanning device 111 does not include any receivers and the second scanning device 111 does not include any emitters. As will be understood, the emitter(s) and receiver(s) are configured to emit and receive, respectively, the signal and reflected signal.

Figure 4:
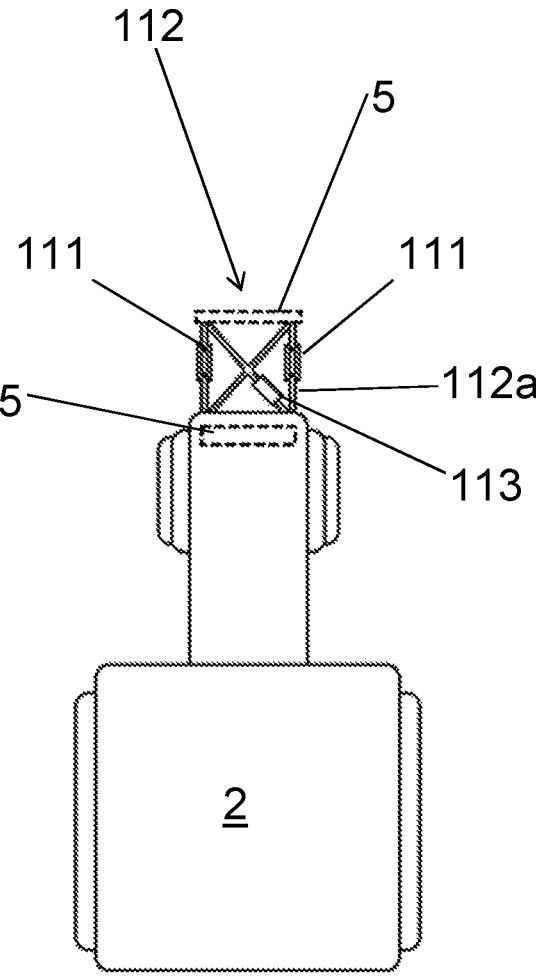
FIG. 4 shows a vehicle to which an example scanning head assembly has been mounted.
Figure 5:
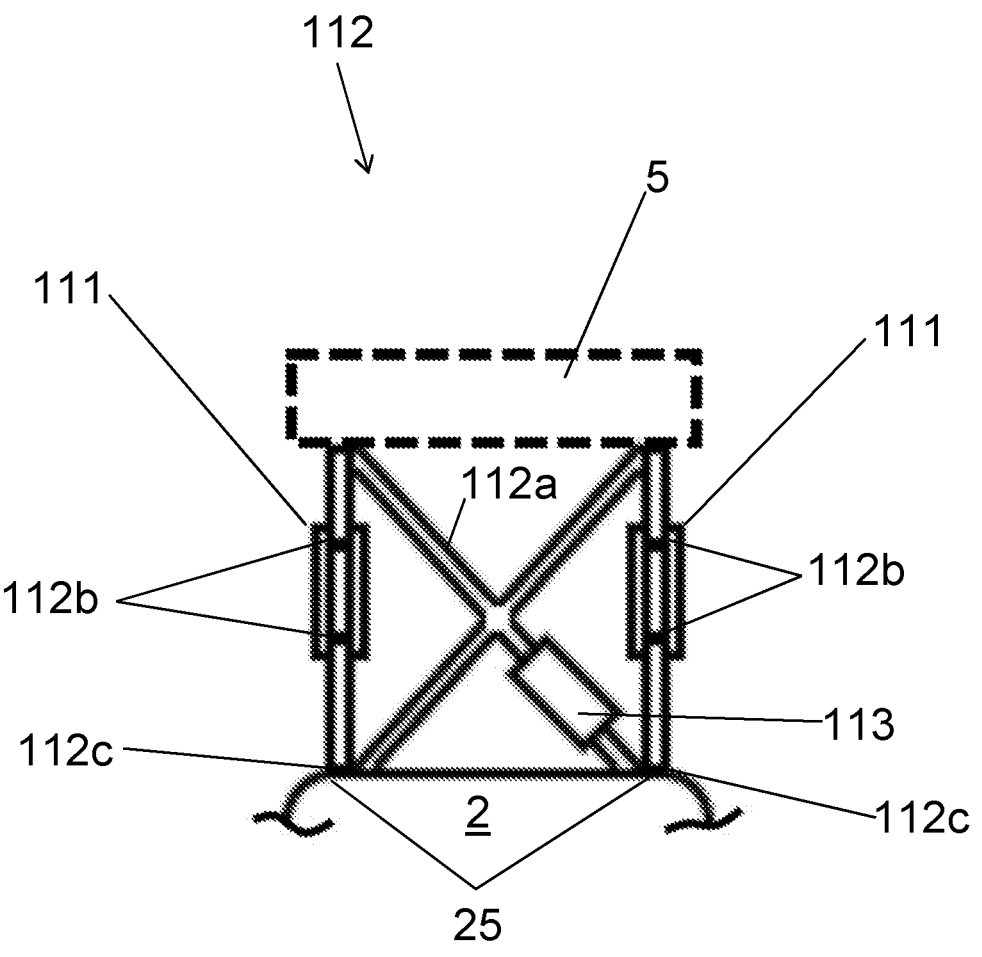
FIG. 5 shows an enlarged view of a part of FIG. 4.
Figure 6:
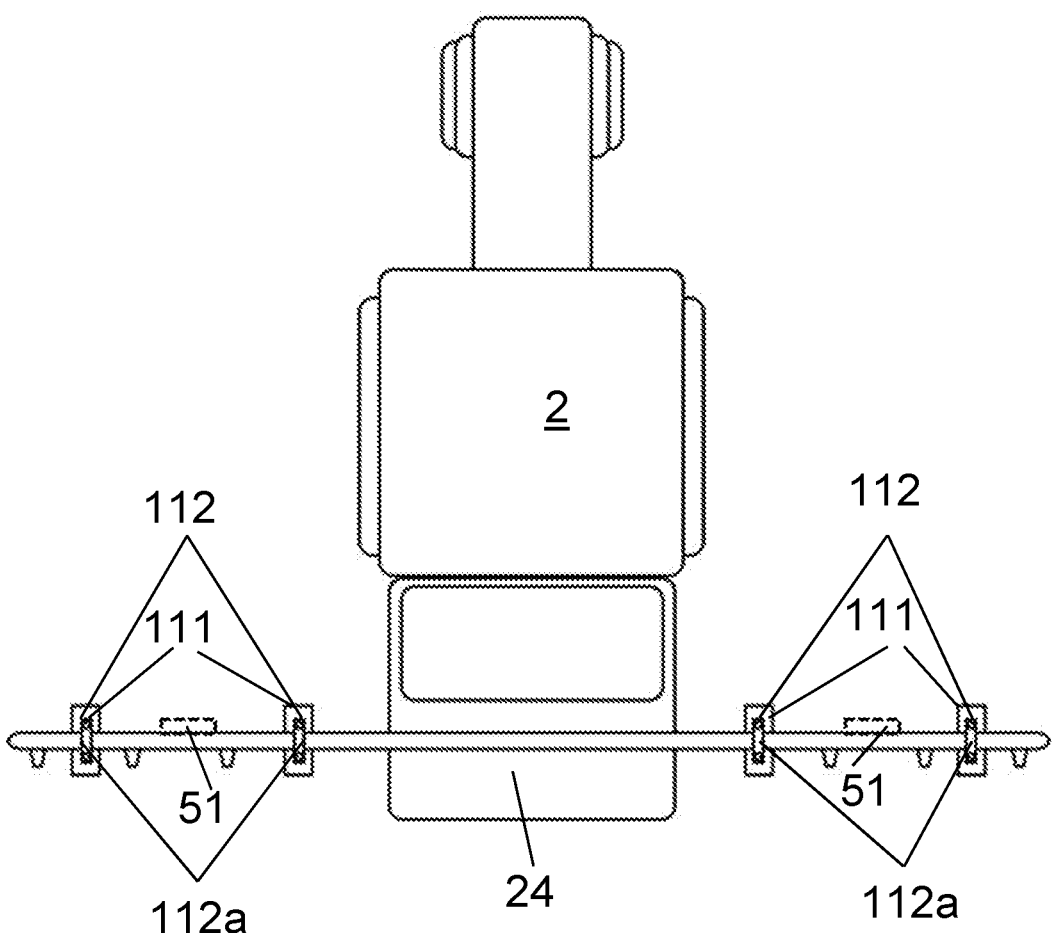
FIG. 6 shows a vehicle and attachment to which an example scanning head assembly has been mounted.

The scanning head assembly 11 may include a mounting structure 112—see FIGS. 4-6, for example. The mounting structure 112 is configured to carry the or each scanning device 111. The mounting structure 112 may, therefore, be configured to support (when in use as described herein, for example) the or each scanning device 111 with respect to a surface and that surface may be a ground surface.

For the avoidance of doubt, the ground surface may be the top surface of the ground and the ground may be in the form of soil (i.e. dirt). The crop (e.g. the primary crop) may be located beneath this surface and, in this case, beneath the ground surface. There may be foliage above the ground surface, which may be foliage associated with the crop (e.g. part of the same plant) or which may be independent foliage (e.g. weeds or some other plant(s)).

The mounting structure 112 may be configured to be secured to a vehicle 2 (see FIGS. 4 and 5, for example). The vehicle 2 may be a self-propelled vehicle 2 such as a tractor, an all-terrain vehicle (ATV) (which may be a quad bike, or a three-wheeler, for example), or a truck, for example. The mounting structure 112 may, additionally or alternatively, be configured to be secured to a trailer or another attachment 24 for the vehicle 2 (see FIG. 6 in which the trailer or other attachment 24 is in the form of a sprayer). The trailer or other attachment 24 may be removable from the vehicle 2 (i.e. may not be an integral part of the vehicle 2). As such, the mounting structure 112 may be configured to be mounted directly to a vehicle 2 or indirectly to the vehicle 2 (via a trailer or other attachment 24).

The vehicle 2 may be driven by one or more electric motors, and/or may include an internal combustion engine. The vehicle 2 may be driven by a human operator (who may be located on/in the vehicle 2 or who may be remote from the vehicle 2) or may be driven by an automated driving system (which may be configured to control the operation, or aspects of the operation of the vehicle 2 such as navigation, without substantive human intervention).

The vehicle 2, or trailer or other attachment 24 may be configured to perform one or more other operations in relation to the crop. The or each other operation may include a spraying operation (e.g. spraying water, fertiliser, pesticide, or fungicide), a cutting operation (e.g. to cut foliage associated with the crop, which may include foliage of plants forming the crop and/or of weeds or other plants in the vicinity of the crop), a scanning operation (e.g. a visual inspection of the crop), a harvesting operation, or the like.

The mounting structure 112 may be configured to support the or each scanning device 111 in a generally fixed positional relationship with the vehicle 2 or trailer or other attachment 24. In some embodiments, however, the mounting structure 112 may be configured to support the or each scanning device 111 in a generally fixed positional relationship with the ground surface and this may require some movement of the mounting structure 112 (or a part thereof) with respect to the vehicle 2 or trailer or other attachment 24 to which it is secured in some embodiments. This movement with respect to the vehicle 2 or trailer or other attachment 24 may be within a limited range of movement, as described herein, and that limited range of movement may be defined by the mounting structure 112, again as described herein.

The scanning head assembly 11 may include a control system 113. The control system 113 may be communicatively coupled to the or each scanning device 111 and may be configured to control one or more aspects of the operation thereof. The communicative coupling between the control system 113 and the scanning device 111 may be a wired and/or wireless communicative coupling.

The control system 113 may include a data storage module 113a which is configured to store data representative of signals received by the or each scanning device 111. This stored data may be referred to as scan data, for example, and is the result of a scanning operation or process performed by the crop scanning system 1. The scan data may be stored by the control system 113 (e.g. by the data storage module 113a) for subsequent processing either by the control system 113 or by an analysis system 12 of the crop scanning system 1. In embodiments in which the control system 113 performs subsequent processing, then it may be that the analysis system 12 forms part of the control system 113 (although other embodiments are also described herein).

In some embodiments the control system 113 is not part of the scanning head assembly 11 but is part of the wider crop scanning system 1.

The control system 113 may be carried by the mounting structure 112 and/or may be carried by the vehicle 2, or trailer or other attachment 24. As such, the control system 113 may include some components carried by the mounting structure 112 and some components carried by the vehicle 2 or trailer or other attachment 24, or may be substantially entirely carried by one or the other of the mounting structure 112 and the vehicle 2, or trailer or other attachment 24. Indeed, in embodiments including a trailer or other attachment 24, the control system 113 or some components thereof may be carried by the vehicle 2 and/or the trailer or other attachment 24.

The analysis system 12 may include one or more processors 121 configured to perform one or more operations on the scan data. The analysis system 12 may be configured, therefore, to receive the scan data from the control system 113 (in embodiments in which the analysis system 12 is not part of the control system 113) or from the data storage module 113a (in embodiments in which the analysis system 12 is part of the control system 113). The one or more processors 121 may be configured to process the received scan data and may generate one or more analysis results associated with the scan data.

The analysis system 12 may be a remote system (i.e. may be remote from the scanning head assembly 11) or may be a part of the scanning head assembly 11 (i.e. a local system).

In some embodiments, the analysis system 12 is a cloud-based system (which is a form of remote system) which includes one or more servers 122 (of which the one or more processors 121 may be part). The analysis system 12 may be configured to communicate with the control system 113 (in some embodiments, or some other part of the scanning head assembly 11, as depicted in FIG. 3, for example) over a computer network and that computer network may include the Internet (e.g. as represented by the cloud depiction in FIG. 3).

The analysis system 12 may be configured to output the or each analysis result to a user interface device 3 (see FIG. 1, for example) for display to a user. The analysis system 12 may be configured, additionally or alternatively, to output the or each analysis result to an automated operation system 4 which may be configured to perform (or instruct the performance of) one or more operations with respect to the crop (e.g. the application of fertiliser, pesticide, fungicide, water, and/or the like, the harvesting of the crop, the removal of foliage, a weeding operation, or similar).

The analysis system 12 may be configured to receive, in addition to the scan data, supplemental crop information (i.e. data). The analysis system 12 may be configured to use the supplemental crop information in the processing of the scan data to generate the or each analysis result. The supplemental crop information may include information collected about the crop at a different time to the collection of the scan data, and/or by equipment other than the scanning head assembly 11, for example.

In some embodiments, the supplemental crop information includes information (i.e. data) generated from one or more images of the crop. These one or more images may have been collected at or around the time of the scan data collection or may have been collected at an earlier time. In some embodiments, the scan data and the or each image may have been generated at substantially the same time (i.e. substantially simultaneously).

In some embodiments, the supplemental crop information was collected by an imaging system 5—see FIGS. 1, 3, 7, and 8, for example). This imaging system 5 may be part of the crop scanning system 1 or may be separate therefrom.

The imaging system 5 may include one or more imaging devices 51 configured to capture one or more images of the crop or a part thereof. The or each imaging device 51 may be carried by the vehicle 2 (as described herein) or the trailer or other attachment 24 (also as described herein).

Figure 7:
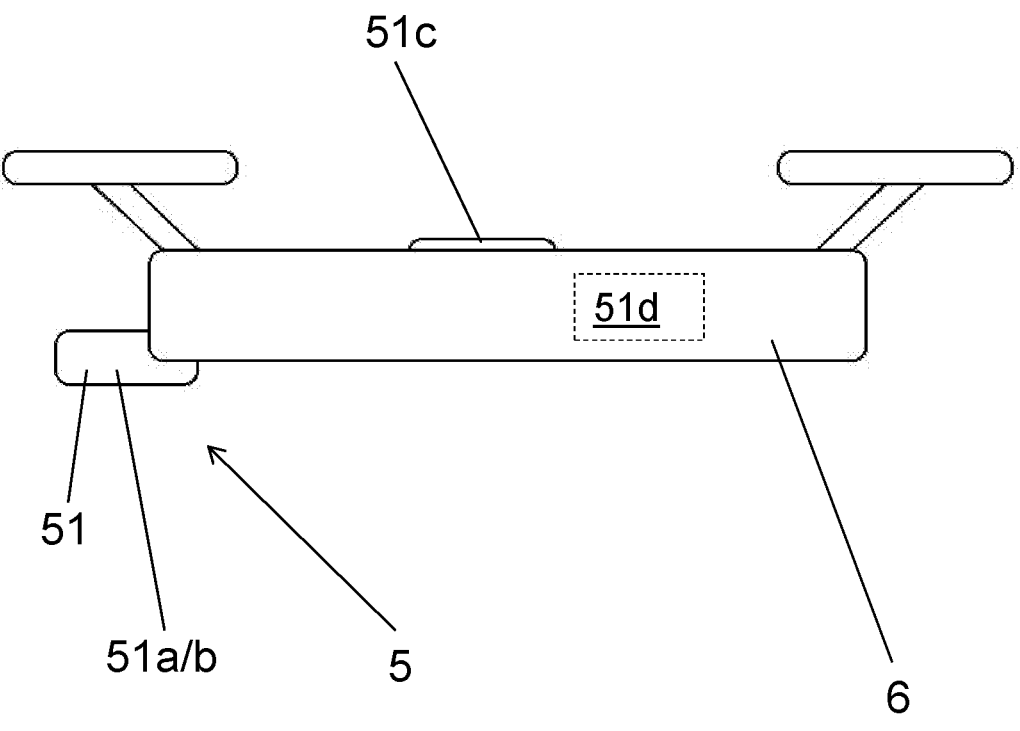
FIG. 7 shows a partially schematic view of an imaging vehicle of some embodiments.

In some embodiments, the or each imaging device 51 is carried by an air vehicle 6 (e.g. as depicted in FIG. 7) which may be an unmanned air vehicle (generally known as a "drone"). The air vehicle 6 may, therefore, be configured to fly over (or near) at least part of the crop during which time the or each imaging device 51 may capture one or more images of the crop or a part of the crop.

Figure 8:
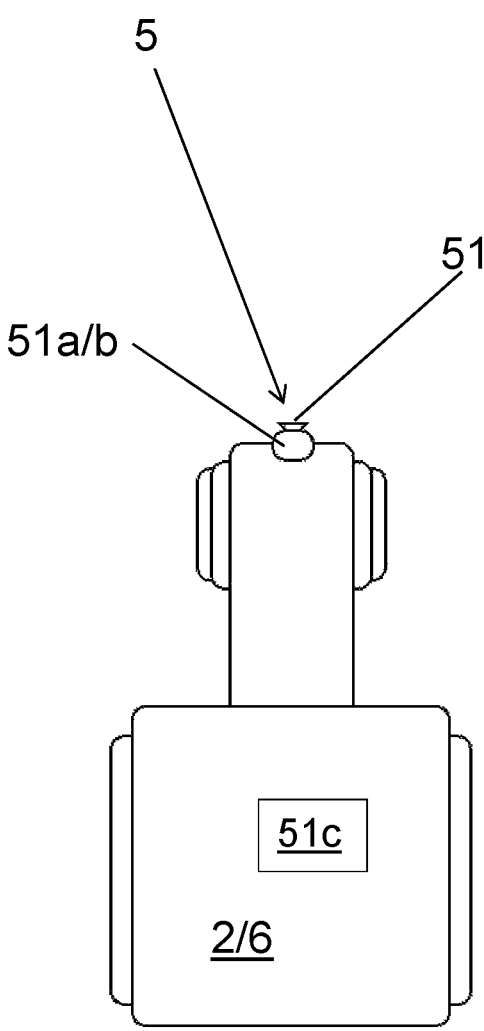
FIG. 8 shows a view of another imaging vehicle of some embodiments.

Other types of vehicle to carry the or each imaging device 51 are envisaged and the vehicle is generally referred to herein as an imaging vehicle 6 (see FIG. 8, for example). In some embodiments, the imaging vehicle 6 may be the vehicle 2 (in which case the imaging vehicle 6 is not an air vehicle 6).

The imaging system 5 may be configured to output the one or more images as the supplemental crop information and/or may be configured to perform one or more operations on the images (i.e. analysis of one or more aspects of the images) and to output the results of that or those operations as the supplemental crop information.

This supplemental crop information may include an indication of the number of harvestable items in all or part of a crop. The supplemental crop information may include location information (such as geographic location information) such that the supplemental information includes an indication of the number of harvestable items at one or more locations.

In some embodiments, the supplemental crop information is generated by analysis of the one or more images and this may include, for example, the identification of one or more stems (which may be meristems) within the one or more images, and/or the counting of the one or more identified stems (which may be meristems), and/or the correlation of the number of stems (which may be meristems) to a number of harvestable items (e.g. using an index or other form of lookup table or model).

In some embodiments, the supplemental crop information includes the one or more images (or parts thereof) and further analysis of the or each image (e.g. to the identify one or more stems within the one or more images, to count the one or more identified stems, or to correlation of the number of stems to a number of harvestable items (e.g. using an index or other form of lookup table or model)) may be performed elsewhere—such as by the analysis system 12.

Accordingly, embodiments are configured to obtain information about a crop and to generate outputs which may be presented to a user and/or used in the performance of one or more operations in relation to the crop.

The various parts of some embodiments, and the operations they perform, are now described in more detail.

The or Each Scanning Device

Figures 9, 10, 11:
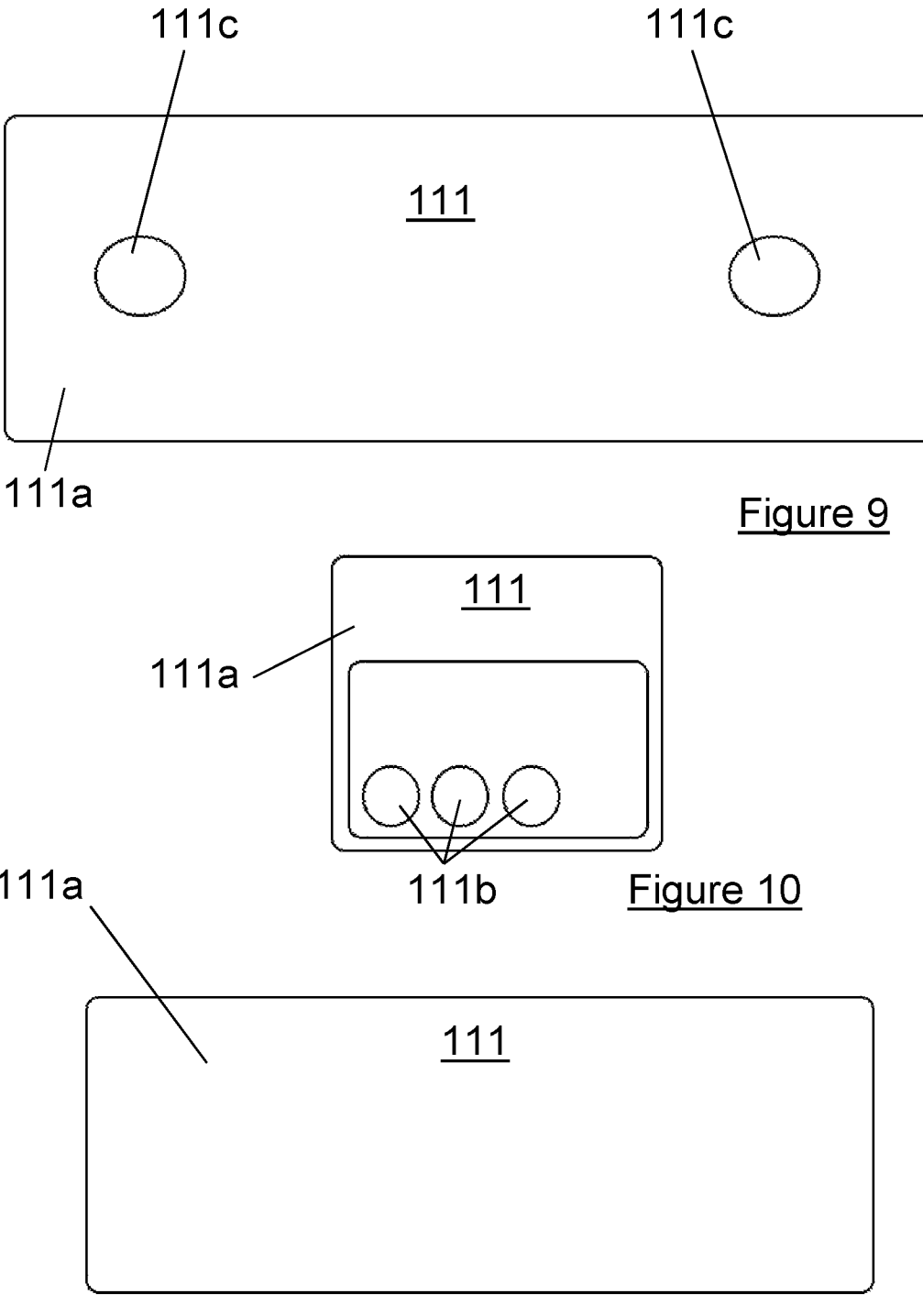
FIG. 9 shows a top plan view of a scanning device.
FIG. 10 shows an end plan view of the scanning device of FIG. 9.
FIG. 11, shows a side view of the scanning device of FIG. 9.

As described herein, the scanning head assembly 11 may include one or more scanning devices 111—see FIGS. 9-11, for example. The or each scanning device 111 may—individually or in combination—be configured to emit a signal, a scanning signal or pulse, and to receive a reflected signal or pulse (the reflected signal or pulse being the scanning signal or pulse reflected by an object or material). In some embodiments, the or each scanning device 111 may be provided as one or more pairs of scanning devices 111, wherein a first of the pair of scanning devices 111 is configured to emit the scanning signal or pulse and a second of the pair of scanning devices 111 is configured to receive the scanning signal or pulse as transmitted through the volume being scanned (rather than the reflected signal or pulse).

It may be that a single scanning device 111 includes both the or each emitter and the or each receiver. However, it may be that one scanning device 111 includes, exclusively, the or each emitter and that another one scanning device 111 includes, exclusively, the or each receiver—such that the scanning signal is emitted by one scanning device 111 and received by another scanning device 111. As described, the or each scanning device 111 may include a plurality of emitters and/or receivers which may be arranged in an array or respective arrays.

It may also be that one scanning device 111 (irrespective of whether it is configured to emit its own scanning signal or pulse) is configured to receive reflected signals or pulses from a plurality of other scanning devices 111. Likewise, a scanning signal or pulse emitted by one scanning device 111 may be received by multiple other scanning devices 111.

The scanning signal or pulse may be an electromagnetic wave and that wave may be in a radar frequency range as described herein (e.g. in the frequency range of about 10 MHz to about 6 GHz, or about 30 MHz to about 6 GHz). In some embodiments, the or each scanning device 111 is a ground penetrating radar device.

As will be appreciated, therefore, the scanning signal or pulse may be emitted towards a ground surface and at least part of that signal or pulse may penetrate the ground surface (as well as a portion potentially being reflected by the ground surface and/or any foliage covering the ground surface or a part thereof). The portion of the scanning signal or pulse which may penetrate the ground surface may then be reflected by one or more objects and/or materials within the ground.

These one or more objects may include, for example, parts of a crop which are underground—such as parts of a plant's root system and this may include the parts of the crop which is to be harvested (i.e. the or each harvestable item). In the example of a potato crop, the one or more harvestable items may include one or more potatoes (the or each harvestable item may also be referred to herein as one or more target objects). As discussed, potatoes are just an example of harvestable item.

The scanning signal or pulse may be emitted according to various different emission schemes to provide, beamforming or beam steering, or the like.

The ground is not, however, uniform material—aside from the target object or objects. The ground will inevitably include stones, rocks, voids, and water, for example, along with the soil forming the likely majority of the ground being scanned also varying in density and composition. Items such as stones and rocks are examples of artefact items. Other artefact items may include rubbish items (i.e. trash), irrigation items (e.g. water pipes), archaeological items, and the like (e.g. manmade items). These are also artefact items and the artefact items are potential sources of error in relation to a scanning operation—as is discussed herein—as they may be mistaken for a target object and/or may obscure or distort target objects. Whilst voids and changes in ground density are not objects, as such, these are also examples of other artefact objects within the meaning used herein as they serve to hinder a scanning operation in relation to the or each target object.

As will be understood, therefore, the one or more objects may include one or more target objects and/or one or more artefact objects.

As is known in the art of ground penetrating radar systems, the reflected signal or pulse may be used, along with knowledge of one or more parameters of the scanning signal or pulse, to determine information about the location and size of the one or more objects, including the or each target object. In some embodiments, however, it is not the reflected scanning signal or pulse which is used. In such embodiments, a first scanning device 111 may include one or more emitters and a second scanning device 111 may include one or more receivers, the two scanning devices 111 may be arranged on opposing sides of a volume to be scanned (e.g. a ridge of ground material containing the or each target object). The scanning signal or pulse which is not reflected by objects may then be used to determine information about the location and size of the one or more objects (including the or each target object).

A variety of different techniques may be used in relation to the emission of the scanning signal or pulse and the receipt of the reflected signal or pulse. Embodiments are not dependent on any particular methodology used.

In some embodiments, the or each scanning device 111 may be a QuadPack™ device sold by Chelton Limited, UK, (trading as Cobham Antenna Systems) and Cobham Limited, UK, as part of their AMULET™ system.

The or each scanning device 111 may be controllable to change one or more parameters associated with its respective operation—including, for example, frequencies of the scanning signal or pulse, duration of the scanning signal or pulse, the shape of the scanning signal or pulse, the phase of the scanning signal or pulse, the sample rate for the reflected signal or pulse, and the like.

The or each scanning device 111 which includes a receiver for the reflected signal or pulse is configured to generate a scan result signal which is indicative of one or more aspects of the received reflected signal or pulse (the scan result signal is an example of the scan data and the terms are used interchangeably). In some embodiments, this scan result signal is a digitised or analogue signal representative of the received reflected signal or pulse—i.e. a generally unprocessed output (although some filtering may have been applied, for example, within the scanning device 111 (which may, accordingly, include one or more filters)). In some embodiments, the scan result signal may have been processed or pre-processed within the respective scanning device 111 (which may include components—such as a processor—to perform such processing or pre-processing). The processing or pre-processing may include filtering, attenuation, amplification, interpretation, or the like.

The or each scanning device 111 may be housed in a protective casing 111a. In some embodiments, a single protective casing 111a may house a plurality of scanning devices 111. In some embodiments, a single protective casing 111a may house a single scanning device 111. When used herein "single" means one and only one. The protective casing 111a may be considered to be part of the or each scanning device 111.

The or each scanning device 111 may include one or more interface ports 111b—which may include an input interface port, an output interface port, and/or an input & output interface port. The or each interface port 111b may be used to control the operation of the respective scanning device 111 and to output the scan result signal (i.e. the indicative of one or more aspects of the reflected signal or pulse). The or each interface port 111b may, therefore, be configured to be communicatively coupled to the control system 113.

The or each interface port 111b may be a physical port to which a connector is to be coupled—to provide wired communication, e.g. with the control system 113. In some embodiments, the or each interface port 111b includes at least one wireless interface port and so there is no physical port to which a connector is to be coupled.

The or each interface port 111b may include at least one power port which is configured to receive electrical power to power the operation of the scanning device 111.

The scanning head assembly 11 may include, therefore, a power supply 114 which is configured to provide electrical power to the or each scanning device 111, for example (and/or the control system 113). The power port of the or each interface port 111*b* may be configured, as such, to receive electrical power from the power supply 114 and may, accordingly, be configured to be connected thereto via a wired connection. In some embodiments, the connection of the or each scanning device 111 to the power supply 114 may be via the control system 113—such that the power supply 114 provides electrical power to the control system 113 and a portion of that electrical power is then provided to the or each scanning device 111. In some embodiments, the power port is a shared port which provides not only electrical power but also the communication of data such as the scan result signal and/or one or more control signals.

The or each interface port 111*b* may be a port which is provided in the respective protective casing 111*a* and more than one such port 111*b* may service multiple scanning devices 111 if the protective casing 111*a* houses a plurality of scanning devices 111, for example (or each scanning device 111 may include its own interface port 111*b* or ports 111*b*).

The or each scanning device 111 has a main scanning direction. In general, the or each scanning device 111 is configured to perform a scanning operation in (or across) the main scanning direction (which may be a range/swathe of directions) and the volume to be scanned should be located in the main scanning direction with respect to that scanning device 111.

As will be understood, the or each scanning device 111 may be configured to perform a respective scanning operation by emitting the scanning signal or pulse across a volume—e.g. a swathe. The main scanning direction may, therefore, be a central axis of the volume.

The or each scanning device 111 may be configured to be supported above a ground surface and may, therefore, be coupled to the mounting structure 112. In some embodiments, the or each scanning device 111 is secured to the mounting structure 112 using one or more device securing points 111*c* of each respective scanning device 111. In some embodiments, the or each device securing point 111*c* is a part of the protective casing 111*a* for that scanning device 111 or those scanning devices 111*a*. The or each device securing point 111*c* may be an aperture defined by a part of the scanning device 111 (e.g. by a part of the protective casing 111*a*) configured to receive at least part of a bolt (a bolt which may also pass through a corresponding aperture defined by at least part of the mounting structure 112). As will be understood, a nut and bolt arrangement is just one example of a fixing which may be used to secure the or each scanning device 111 to the mounting structure 112 and other fixings may likewise be used (which may include one or more rivets, welds, or the like).

Figure 12:
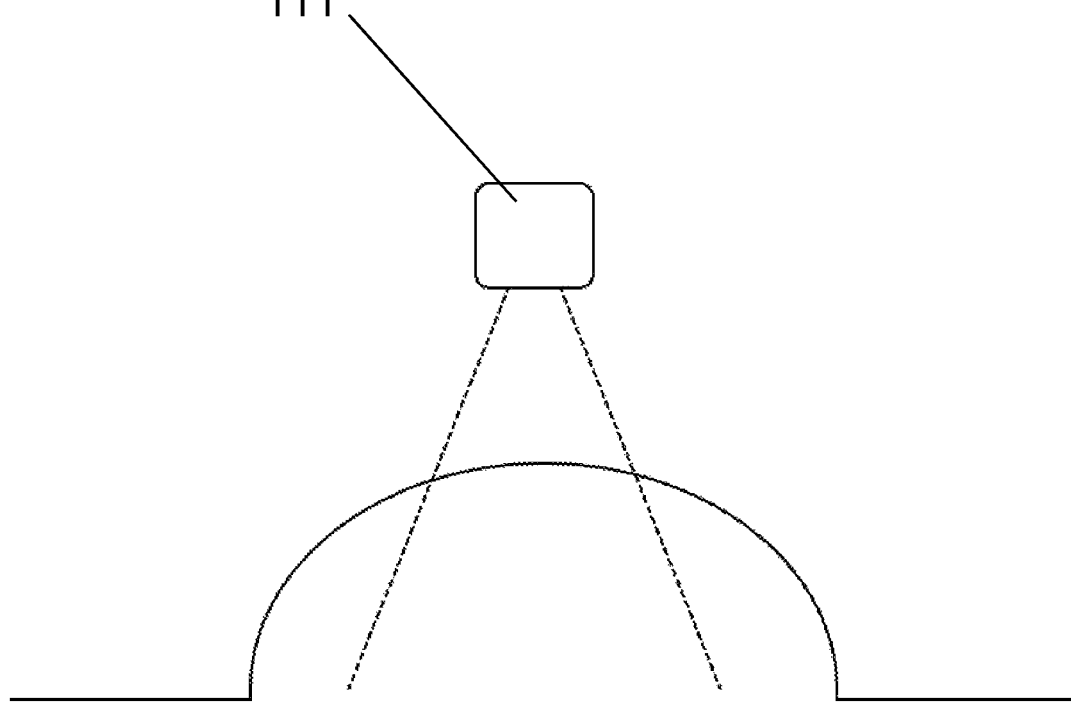
FIGS. 12-14 show example configurations of scanning devices with respect to a ground surface including a ridge according to some embodiments (with the swathe of each scanning device generally shown by the broken lines)
Figure 13:
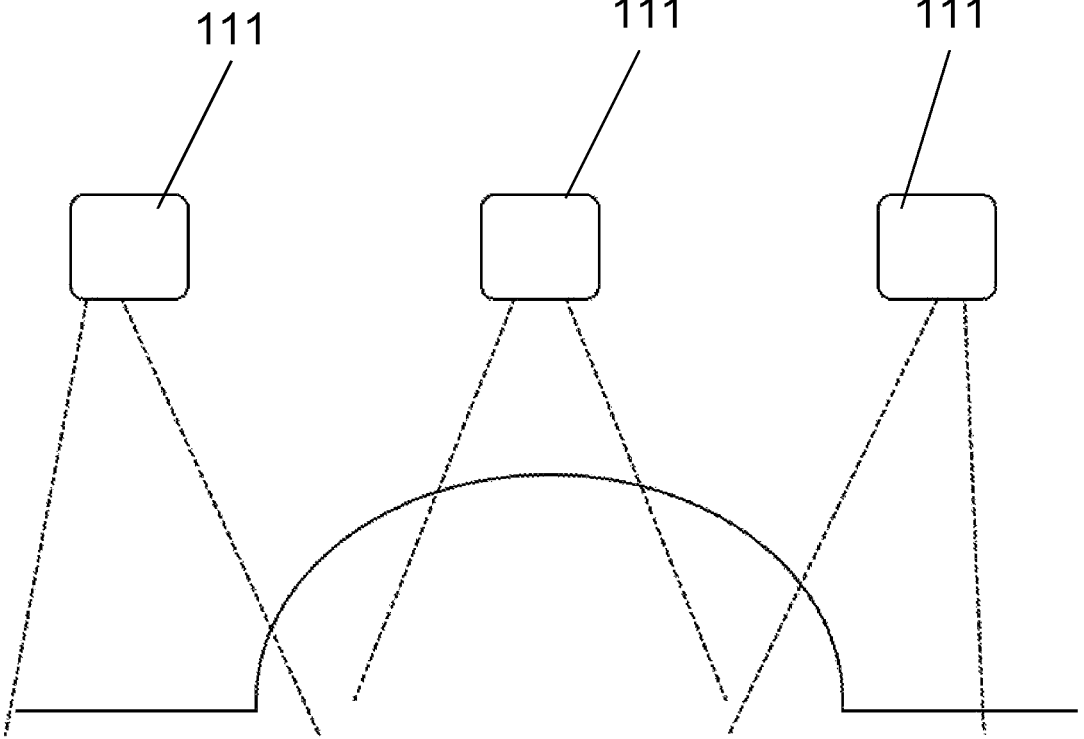
Figure 14:
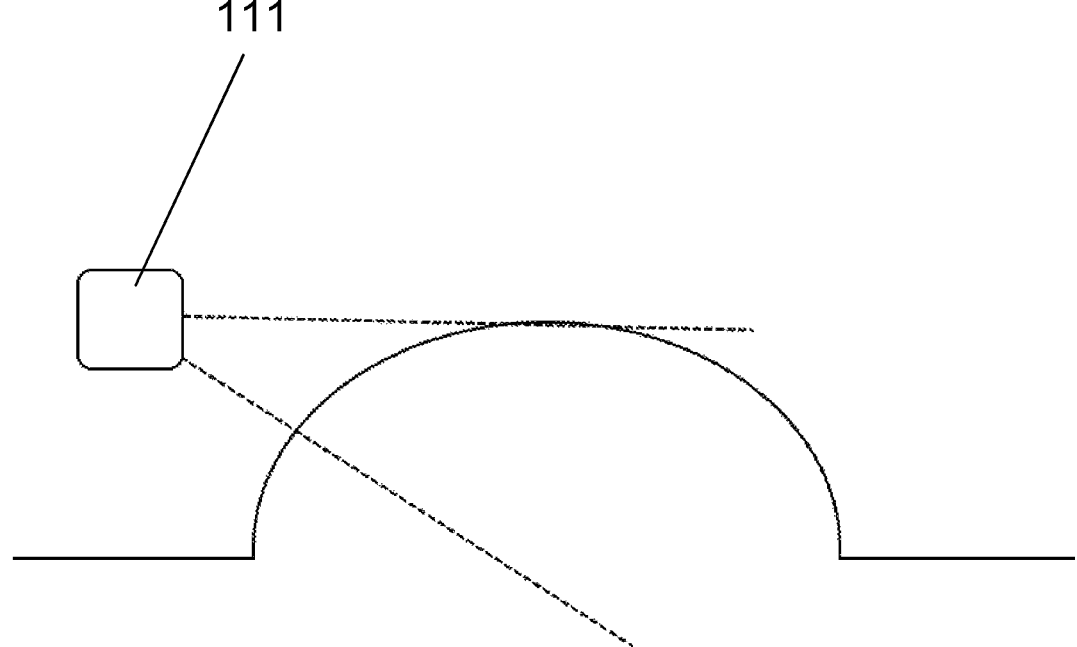
Figure 15:
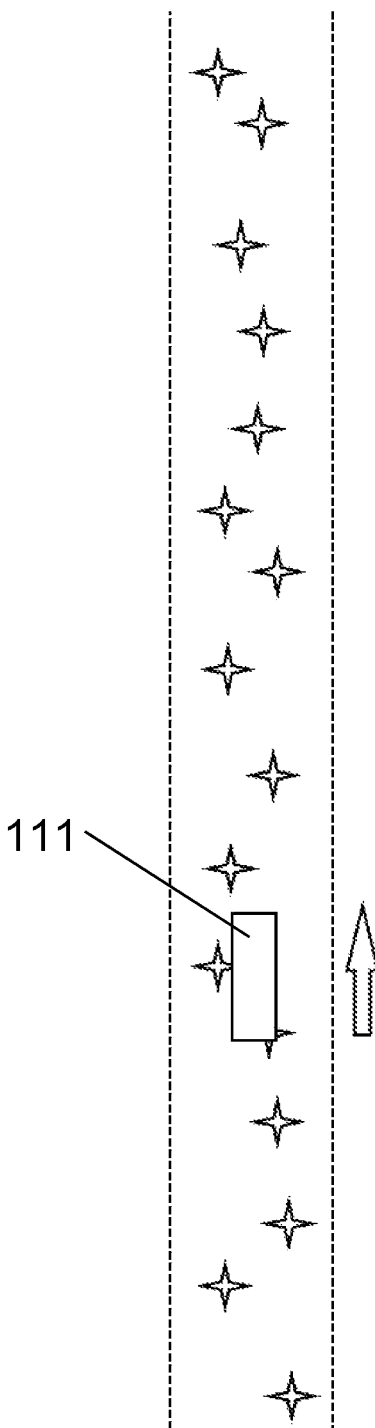
FIGS. 15-23 show example configurations of scanning devices with respect to a ground surface including a ridge according to some embodiments (with a direction of travel of the scanning devices indicated by the arrow and harvestable items indicated with stars)
Figure 16:
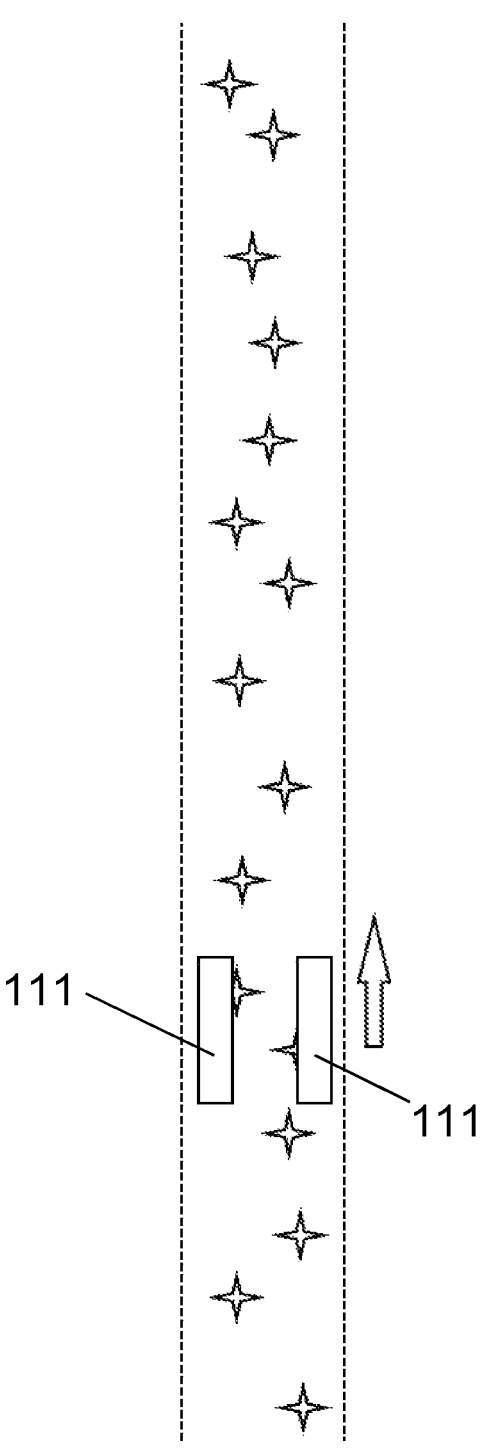
Figure 19:
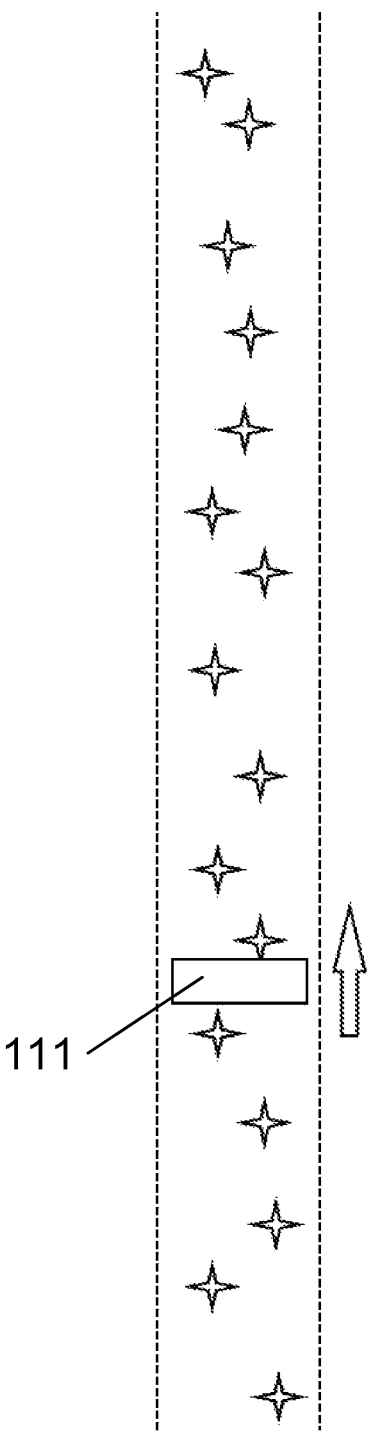
Figure 22:
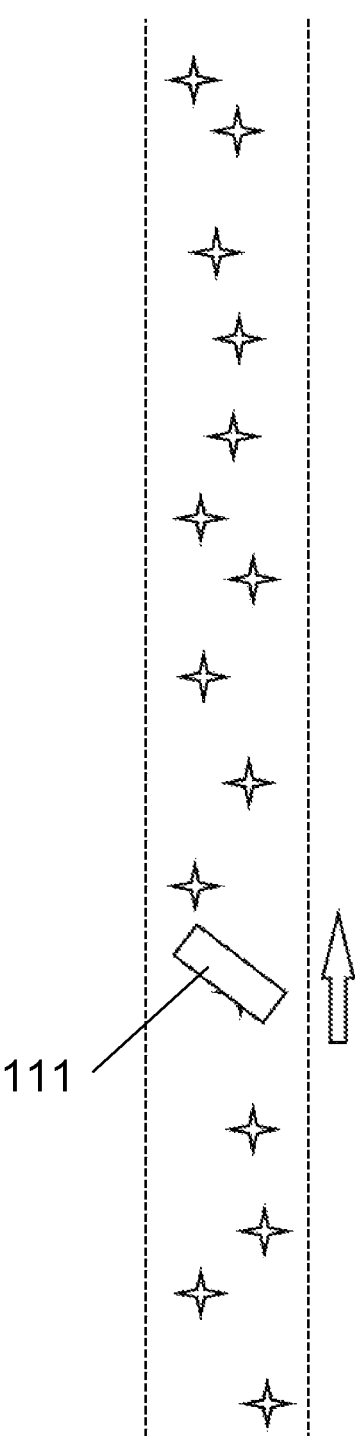

The or each scanning device 111 may be coupled to the mounting structure 112 such that a main plane of the swathe of the scanning operation is substantially perpendicular to the direction of travel of the or each scanning device 111 with respect to the ground surface—see FIGS. 12-14, for example, which show scanning devices 111 with respect to a ridge in the ground surface with the swathe of emitted and/or reflected signals or pulses for each scanning device 111 represented by broken lines. In some embodiments, at least one of the one or more scanning devices 111 is coupled to the mounting structure 112 such that a main plane of the swathe of the scanning operation is substantially parallel to the direction of travel of the or each scanning device 111 with respect to the ground surface—note the alignment of the scanning devices 111 in FIGS. 15 and 19, for example—with the arrow showing the direction of travel, the broken lines depicting a ridge and the stars representing harvestable items. In some embodiments, at least one of the one or more scanning devices 111 is coupled to the mounting structure 112 such that a main plane of the swathe of the scanning operation is angled with respect to the direction of travel of the or each scanning device 111 with respect to the ground surface (which is neither parallel to nor perpendicular to that direction of travel)—see, for example, the alignment of the scanning device in FIG. 22.

Figure 23:
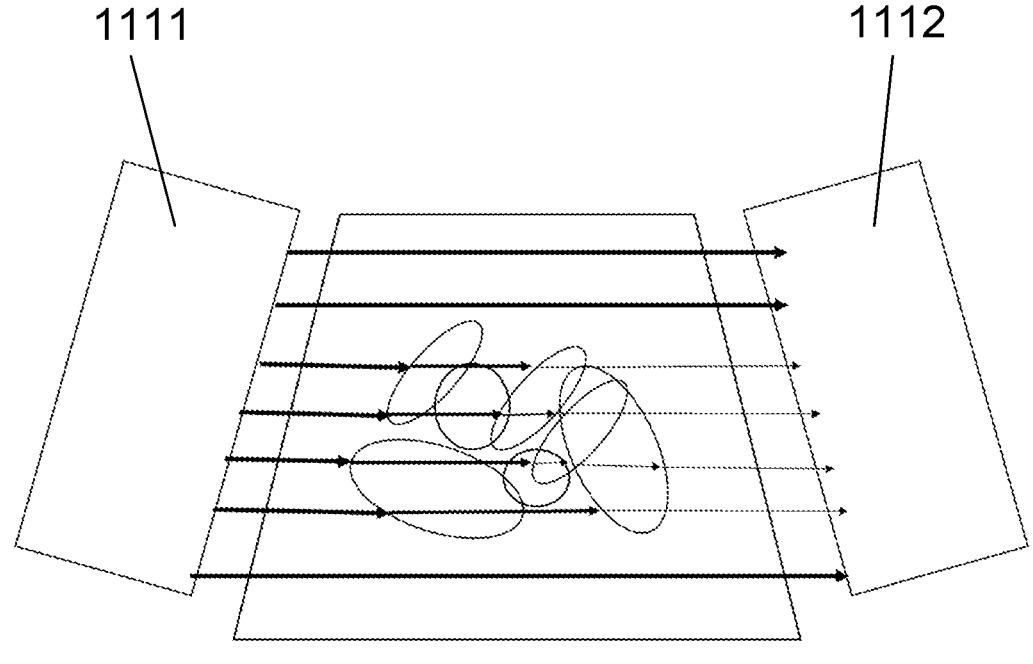
Figure 24:
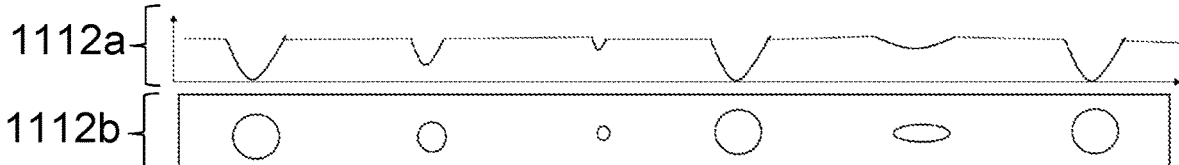
FIG. 24 is a schematic representation of the signal received from using a scanning device configuration such as that of FIG. 23.

With reference to FIGS. 23 and 24, in some embodiments, there may be two scanning devices 111 provided in a pair (including a first 1111 and a second scanning device 1112). The first scanning device 1111 may be configured to emit the scanning signal or pulse, and the second scanning device 1112 may be configured to receive the scanning signal or pulse (as emitted by the first scanning device 1111). Rather than receiving reflected parts of the scanning signal or pulse, the second scanning device 1112 receives parts of the scanning signal or pulse which have been transmitted through the ridge (the ridge being depicted in FIG. 23 in cross-section and including a plurality of target objects). The scanning signal or pulse may be attenuated due to factors including reflection from objects in the ridge (including the or each target object). The received scanning signal or pulse at the second scanning device 1112 may, therefore, be used to determine the size and/or shape and/or location of the or each object (including the target object(s)). This is shown schematically in FIG. 24 which graphically shows the signal 1112*a* received at the second scanning device 1112 aligned with a representation 1112*b* of the objects encountered.

In some embodiments, there may be a plurality of scanning devices 111 which may be coupled to the mounting structure 112 such that a region (e.g. volume) covered by the scanning operation of a first of the plurality of scanning devices 111 overlaps with a region (e.g. volume) covered by the scanning operation of a second of the plurality of scanning devices 111—see FIG. 13, for example. The scanning devices 111 or the control system 113 or the analysis system 12 may be configured to combine the scan data from these scanning operations—e.g. stitching together the scan data to provide scan data for both regions, or averaging the scan data for the overlapping regions to reduce noise in the scan data.

In some embodiments, the or each scanning device 111 may include a device with a rotating set of emitters and/or receivers—such that the region covered by the swathe of the device can be altered without altering the position of the device.

The Mounting Structure

The mounting structure 112 may be a part of the scanning head assembly 11. The mounting structure 112 is configured to support (when in use as described herein, for example) the or each scanning device 111 with respect to, for example, the ground surface. In some embodiments, the mounting structure 112 may be configured to support the imagining system 5 (see the phantom lines in FIGS. 4, 5, and 6 to show possible imaging system 5 locations) with respect to the ground surface, for example. In some embodiments, the imaging system 5 may be mounted directly to the vehicle 2 (as depicted in some figures).

As described, the mounting structure 112 may be configured to be secured to the vehicle 2 and the or each scanning device 111 may be configured to be secured to the mounting structure 112. The mounting structure 112, therefore, may provide a mounting interface between the or each scanning device 111 and the vehicle 2, in some embodiments.

Also as described, the mounting structure 112 may, additionally or alternatively, be configured to be secured to the trailer or the other attachment 24 for the vehicle 2. The mounting structure 112, therefore, may provide a mounting interface between the or each scanning device 111 and the trailer or the other attachment 24, in some embodiments In some embodiments, the vehicle 2, trailer or other attachment 24, may provide at least part of the means by which the mounting structure 112 (or a part thereof) is held with respect to the ground surface. So, for example, the vehicle 2, trailer or other attachment 24, may include one or more ground engaging wheels, tracks or skids. In some embodiments, however, the mounting structure 112 may also or alternatively include a ground engaging part, such as one or more wheels, one or more tracks, or one or more skids.

In a scanning operation—as described herein—the or each scanning device 111 may be moved laterally across the surface (e.g. the ground surface). This movement may be driven by the vehicle 2 and/or the trailer or other attachment 24 (whose movement may also be driven by the vehicle 2). In other words, the vehicle 2 (and/or the trailer or other attachment 24) may provide the propulsion for this movement.

In some embodiments, the scanning head assembly 11 is self-propelled or is configured to be manually pushed or pulled (i.e. pushed or pulled by a person) during a scanning operation. In some such embodiments, the scanning head assembly 11 is carried by a vehicle 2 which is configured to be manually pushed or pulled.

In embodiments in which the scanning head assembly 11 is self-propelled, then the scanning head assembly 11 may include one or more motors 115 which may be configured to drive rotation of one or more ground engaging wheels or tracks, for example. The or each motor 115 may be an electrical motor which may receive electrical power from the power supply 114, for example. In some embodiments, the one or more motors 115 includes an internal combustion engine which may be configured to drive rotation of the or each ground engaging wheel or track, or which may be configured to generate electrical power which is then supplied to at least one electrical motor (of the one or more motors 115) which is configured to drive rotation of the or each wheel or track (e.g. in a hybrid engine configuration).

In embodiments in which the mounting structure 112 includes one or more wheels, tracks, and/or skids, at least one such wheel, track, or skid, may be configured to provide a steering operation for the mounting structure 112 and, so, for the scanning head assembly 11. For example, a steerable wheel may be provided, or two parallel and independently controllable tracks may be provided, or a steerable skid may be provided. In some of these embodiments, the mounting structure 112 may include a steering mechanism 116 which is configured to steer the or each wheel and/or skid, and/or independently control the tracks, as the case may be.

In embodiments in which the mounting structure 112 includes one or more motors 115 and/or a steering mechanism 116, the operation thereof may be controlled by the control system 113.

The mounting structure 112 may include a framework 112a. The framework 112a may be formed from a plurality of beam members arranged to provide a rigid structure to which the or each scanning device 111 (and other components as described herein) may be mounted. The mounting structure 112 (e.g. the framework 112a) may, therefore, include one or more device mounting locations 112b which the or each of which corresponds with the one or more device securing points 111c of the or each scanning device 111, such that the or each scanning device 111 is mountable to the mounting structure 112 using the or each device mounting location 112b and the or each device securing point 111c. The or each device mounting location 112b may include an aperture defined by the framework 112a (or other part of the mounting structure 112) through which a bolt may pass. Thus, the or each scanning device 111 may be bolted (using a nut and bolt) to the mounting structure 112. Other forms of attachment of the scanning device 111 to the mounting structure 112 are also envisaged—e.g. welding, riveting, adhering, or the like. It will be understood that whilst the device mounting locations 112b and device securing points 111c are described as points or locations, they may include one or more respective features to enable the securing/mounting of the items—such as apertures, ridges, recesses, protrusions, threaded parts, and the like.

The mounting structure 112 is also configured to be secured to the vehicle 2, or trailer or other attachment 24. The mounting structure 112 (e.g. the framework 112a) may, therefore, include one or more vehicle attachment points 112c. The or each vehicle attachment point 112c is configured for use in securing the mounting structure 112 to the vehicle 2, or trailer or other attachment 24. The or each vehicle attachment points 112c may, therefore, correspond to mounting locations on the vehicle 2, or trailer or other attachment 24. The or each vehicle attachment point 112c may include an aperture defined by the framework 112a (or other part of the mounting structure 112) through which a bolt may pass. Thus, mounting structure 112 (e.g. the framework 112a) may be bolted (using a nut and bolt) to the vehicle 2, to trailer or other attachment 24. Other forms of attachment of the mounting structure 112 to the vehicle 2, or trailer or other attachment 24 are also envisaged—e.g. welding, riveting, adhering, or the like. It will be understood that whilst the vehicle attachment points 112c are described as points, they may include one or more respective features to enable the securing/mounting of the mounting structure 112—such as apertures, ridges, recesses, protrusions, threaded parts, and the like.

The mounting structure 112 may be configured to secure a plurality of the scanning devices 111 in a common plane—such that all of the scanning devices 111 are generally the same distance from a flat ground surface (when in use)—see FIG. 13, for example. Likewise, the mounting structure 112 may be configured to secure a plurality of imaging devices 51 in a common plane such that all of the imaging devices 51 are generally the same distance from a flat ground surface (when in use).

The mounting structure 112 may be configured to secure a plurality of the scanning devices 111 (and/or imaging devices 51) in a plurality of different planes—such that there is at least one scanning device 111 (and/or imaging device 51) of the plurality which is a different distance from a flat ground surface compared to another of the plurality of scanning devices 111 (when in use). Such an arrangement may be beneficial in relation to scanning operations performed on crops which are planted in ridges of soil. In such situations, the ground surface is not flat and there may be a desire to obtain scan data in relation to multiple locations transversely across the ridge—see FIGS. 13, 14, and 16-23, for example.

Figure 17:
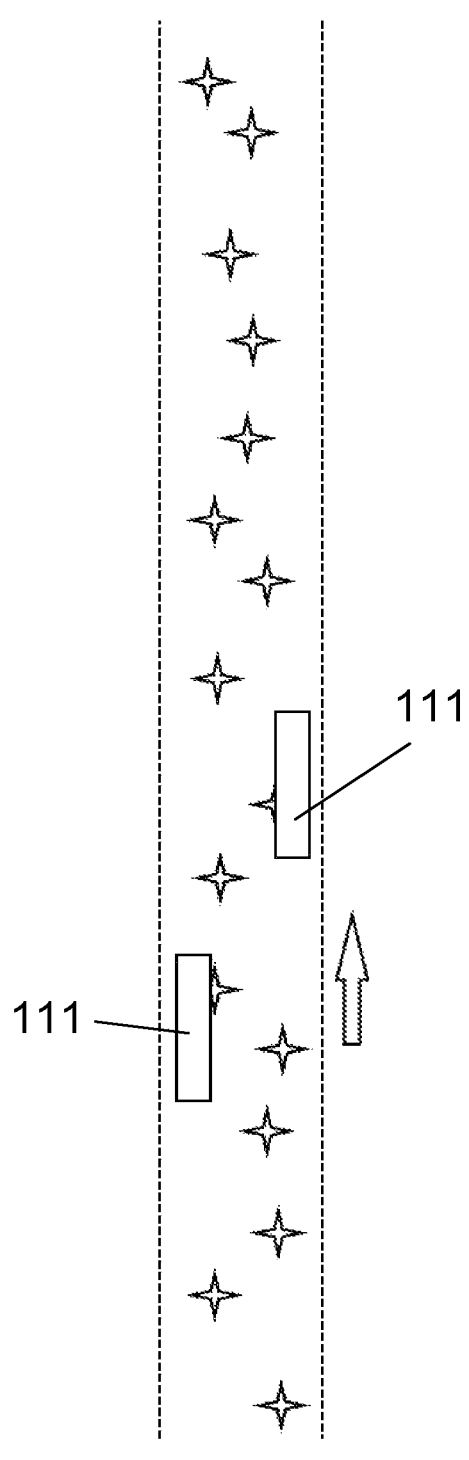
Figure 18:
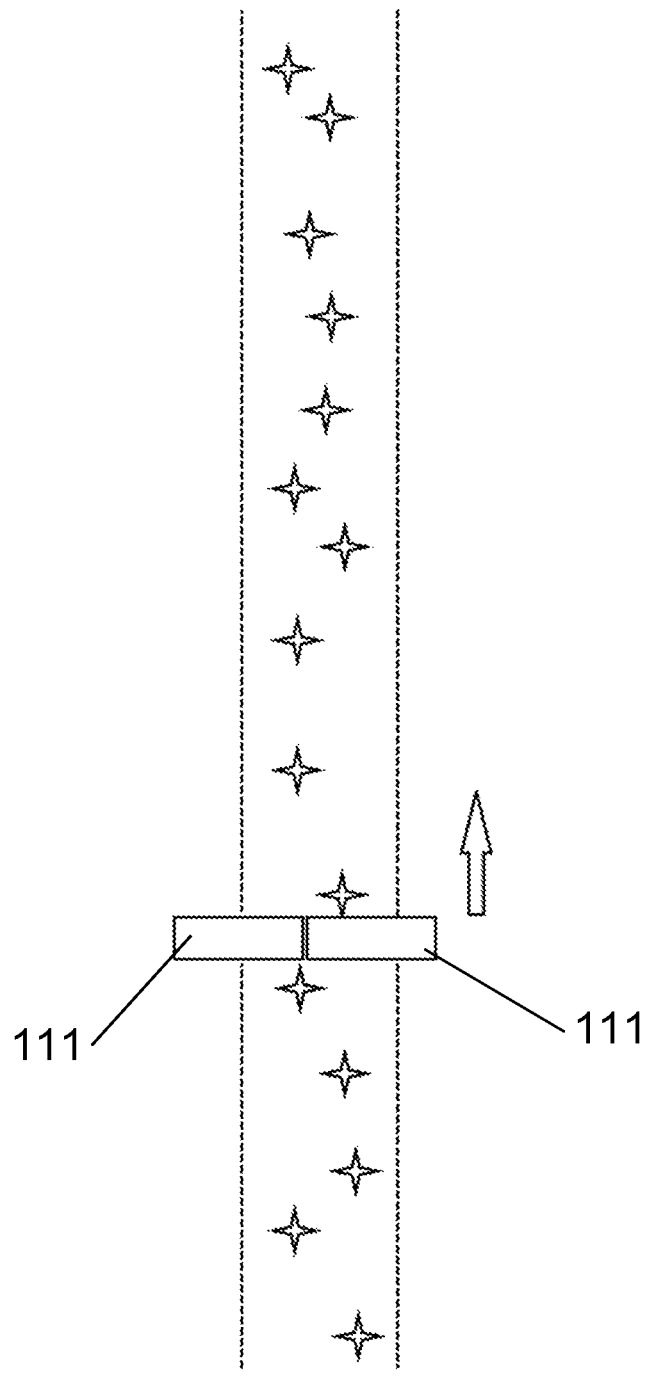
Figure 20:
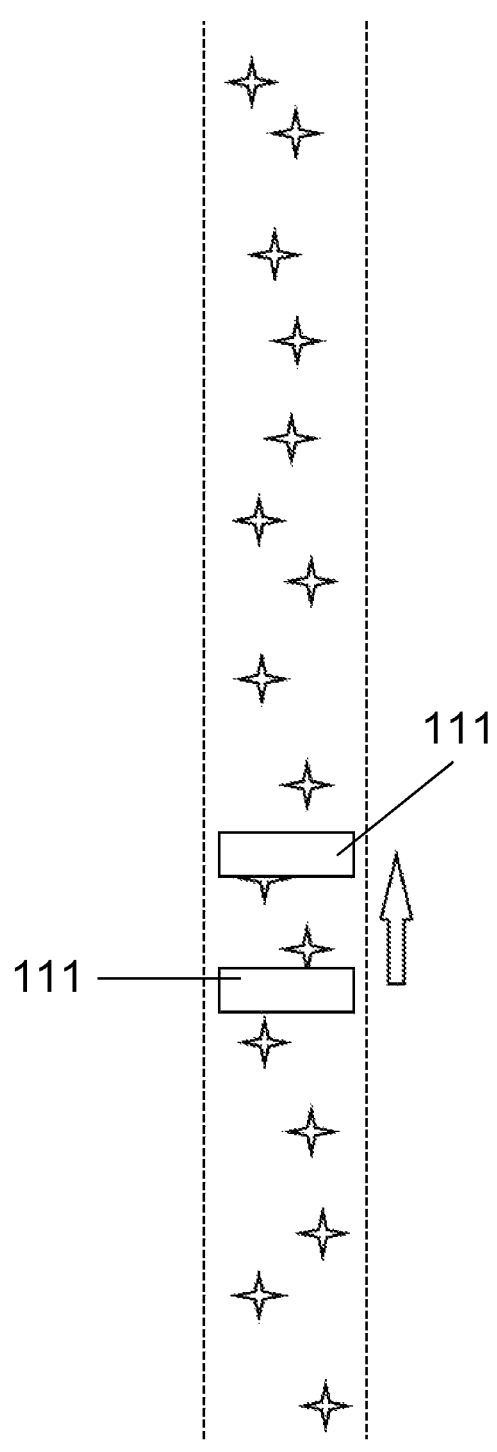
Figure 21:
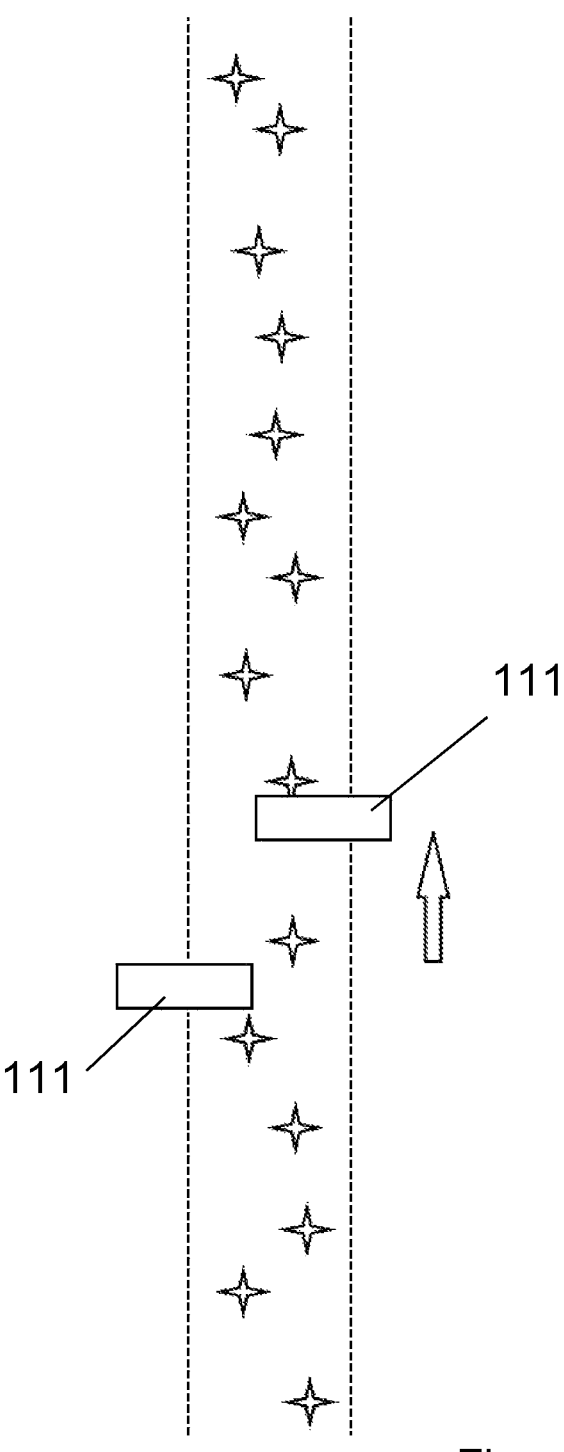

The or each scanning device 111 has a main scanning direction in some embodiments, as described herein—as generally depicted in FIGS. 12-14 by the broken lines. In some embodiments, there may be a plurality of scanning devices 111 and the main scanning directions of the scanning devices 111 may all be generally parallel with respect to each other. This may be the case, for example, if the scanning devices 111 are all arranged in a common plane—as described above. In some embodiments, however, the scanning devices 111 may be secured to the mounting structure such that the main scanning directions converge. This may be the case, for example, if the scanning devices 111 are arranged in at least two different planes—although it is equally envisaged that the scanning devices 111 may be in a common plane but angled with respect to each other such that the main scanning directions converge. In embodiments in which the crop is planted in a ridge, at least one scanning device 111 may be secured to the mounting structure 112 (and the mounting structure 112 may be so configured) such that its main scanning direction is generally towards a first side of the ridge—see FIG. 14, for example. In some such embodiments, there may be at least one additional scanning device 111 which is secured to the mounting structure 112 (and the mounting structure 112 may be so configured) such that its main scanning direction is generally towards a top of the ridge—such as shown in FIG. 12 or 13. In some embodiments, these scanning devices 111 may all be secured such that their main scanning directions are all generally aligned in a longitudinal direction (such that generally the same part of the length of the ridge is scanned by all of these scanning devices 111)—the scanning devices 111 may be operated at different times to achieve time division multiplexing of the scanning operation (see FIGS. 16 and 18, for example). In some embodiments, these scanning devices 111 may be secured such that their main scanning directions are all generally at different longitudinal alignments (such that generally different parts of the length of the ridge is scanned by the scanning devices 111 during simultaneous scanning operations using the scanning devices 111)—such as shown in FIGS. 17, 20, and 21 (with FIGS. 17 and 21 showing a staggered arrangement and FIG. 20 showing an aligned arrangement along the direction of travel).

Framework 112a may, as described, be formed from a plurality of beam members. The beam members maybe arranged in one or more lattice-like structures and/or may include one or more parallel beam members which may include the or each mounting location 112b. The framework 112a may be configured to provide the required arrangement of the or each scanning device 111 and to support the or each scanning device 111 with respect to the vehicle 2, or trailer or other attachment 24, and/or with respect to the ground surface.

In some embodiments, the framework 112a includes multiple independent parts which are configured to be secured to different parts of the vehicle 2, or trailer or attachment 24—see FIG. 6, for example. Each part of the framework 112a may be distanced from another part of the framework 112a, and each part may include its own one or more mounting locations 112b.

As such, in some embodiments, each part of the framework 112b may be configured to carry (i.e. secure) its own, respective, one or more scanning devices 111.

In some such embodiments, each part of the framework 112b may be described as a framework within its own right.

Such multi-part framework 112b arrangements permit the or each scanning device 111 to be distributed around the vehicle 2, trailer or other attachment 24. One example of where such an embodiment may be particularly useful is in relation to a trailer or other attachment 24. For example, the trailer or other attachment 24 may be a crop treatment system such as a sprayer which is configured to spray a crop with a liquid (or other fluid) such as a pesticide, fungicide, fertiliser, or even water. Such sprayers may include a boom which, in use, extends perpendicular to a plurality of crop rows (which may be defined by ridges)—such that movement of the sprayer parallel to the crop rows moves the boom along a length of a plurality of the crop rows. The boom may carry spraying heads which are each configured to spray the crop with a liquid (or other fluid) from a tank. As such, in moving the sprayer along the length of the rows from one end of a row to another, multiple rows of crop may be treated by the crop treatment system. The parts of the framework 112b may be distributed along the boom in some embodiments (other trailers or attachments 24 may likewise include such a boom and these embodiments are not specifically limited to sprayers only) such that scanning devices 111 are likewise distributed across the crop rows. Accordingly, the scanning head assembly 11 may—in this and some other embodiments—include a plurality of scanning devices 111 arranged such that movement of the scanning head assembly 11 along the length of a row of crop, permits a scanning operation to be performed on a plurality of crop rows. As will be appreciated, in some such embodiments, there may be more than one scanning device 111 associated with each crop row and—as described herein—a plurality of scanning devices 111 associated with the same crop row may be in a common plane or not.

In some embodiments, the scanning head assembly 11 (e.g. the mounting structure 112) includes a stabilisation system 112d. The stabilisation system 112d may be configured to seek to maintain a substantially constant orientation of the or each scanning device 111 with respect to, for example, a horizontal plane or the ground surface. The stabilisation system 112d may additionally or alternatively be configured to seek to maintain a substantially constant distance between the or each scanning device 111 (and/or imaging device 51) and a given horizontal plane or the ground surface, for example. These operations of the stabilisation system 112d are generally referred to herein as stabilisation operations.

The stabilisation system 112d is configured to sense a distance to the ground surface. In order to sense a distance to the ground surface (which may be a distance from the scanning head assembly 11 (or a part thereof, such as one of the one or more scanning devices 111 and/or imagining devices 51) to the ground surface) the stabilisation system 112d may be provided with a ranging sensor and this ranging sensor may be in the form of a LiDAR sensor, an infrared distance sensor, an acoustic distance sensor, a microwave sensor, a visible light optical sensor (such as a 3D camera), or a ground penetrating radar distance sensor (which may be one of the one or more scanning devices 111). The ranging sensor may be configured to provide a distance to the ground surface during a scanning operation and may use this alter that distance actively (as described herein), or to allow the processing of the scan data to be compensated for changes in the distance, or to control the operation of the or each scanning device 111 (e.g. in how signals or pulses are emitted and/or processed on receipt). In some embodiments, separate distances are determined for each of the one or more scanning devices 111. The ranging sensor may be configured to distinguish between foliage and the ground surface based on, for example, the frequencies of electromagnetic radiation which are absorbed (i.e. not reflected) by features within a field of view of the ranging sensor (this may include a colour of the features, for example). The same may also be true in relation to the or each imaging device 51.

In some embodiments, the stabilisation system 112d is configured to monitor one or more of the distance of the or each scanning device 111 (and/or imaging device 51) from a ground surface or given horizontal plane, and an orientation of the or each scanning device 111 (and/or imaging device 51) with respect to a ground surface or given horizontal plane—this may then be output to the control system 113 and/or the or each scanning device 111 (and/or imaging device 51). In some embodiments, the distance is in the main scanning direction of the associated scanning device(s) 111 (and this may be a distance from a scanning device 111 to a side of a ridge (of soil), for example).

The stabilisation system 112d may, therefore, be configured to permit and drive movement of the or each scanning device 111 (and/or imaging device 51) (e.g. by movement of the or each mounting location 112b) with respect to the vehicle 2, trailer or other attachment 24 (e.g. with respect to the one or more vehicle attachment points 112c and/or one or more head assembly mounting locations 25). In some embodiments, the or each vehicle attachment point 112c and/or the or each mounting location 112b may be considered to be part of the stabilisation system 112d. The movement may be controlled by the stabilisation system 112d, and/or the control system 113.

The stabilisation system 112d may be configured to provide active stabilisation operations as the scanning head assembly 11 is moved with respect to a crop. For example, a crop may be planted in a field and that field may well have a ground surface which is flat and even. The scanning head assembly 11 mounted to the vehicle 2, or trailer or other attachment 24, will—in such embodiments—likely be subjected to movements other than in a fixed horizontal plane (e.g. as the vehicle 2, trailer or other attachment 24) moves across the uneven ground surface). These movements will, as will be understood, likely include a vertical movement element (which may be a movement along a vertical axis or which may be rotational movement in a non-horizontal plane, for example).

The operation of the or each scanning device 111 (and/or imaging device 51) may be improved, however, through the maintenance of a substantially constant distance between the or each scanning device 111 (and/or imaging device 51) and the ground surface as the crop scanning system 1 is used to scan a crop (i.e. as the scanning head assembly 11 is moved across the crop). The stabilisation system 112d may seek to maintain this distance and improve the scanning operation. In some embodiments, maintaining of this distance is improved by the stabilisation system 112d but the distance will still vary during operation of the crop scanning system 1.

The stabilisation system 112d may include one or more pneumatic or hydraulic actuators—such as a pneumatic or hydraulic ram) which may be configured to drive movement of the or each scanning device 111 (and/or imaging device 51) with respect to the vehicle 2 (e.g. with respect to the one or more vehicle attachment points 112c). For example the or each pneumatic or hydraulic actuators may include a ram with a first end coupled to or being at least one vehicle attachment point 112c and a second end coupled to another part mounting structure 112 (e.g. the framework 112a). The stabilisation system 112d (under its own control or control of the control system 113) may be configured to drive the ram to move the or each scanning device 111 (and/or imaging device 51) in a movement with a vertical component (which might be a vertical movement or a rotational movement in a non-horizontal plane, for example). In some embodiments, all of the one or more vehicle attachment points 112c may be so provided or, in some embodiments, at least one of the one or more vehicle attachment points 112c is not associated with a ram (or other actuator)—such that the at least one of the one or more vehicle attachment points 112c provides a pivot about which movement of the one or more scanning devices 111 (and/or imaging device 51) (by use of the stabilisation system 112d) may be provided.

In some embodiments, the or each scanning device 111 (and/or imaging device 51) (and/or the control system 113) is provided with information about the distance of the or each scanning device 111 (and/or imaging device 51) from a ground surface or given horizontal plane, and an orientation of the or each scanning device 111 (and/or imaging device 51) with respect to a ground surface or given horizontal plane. The scanning device 111 (and/or imaging device 51) (either itself or under control of the control system 113) may be configured to control the output of the or each scanning signal or pulse, or an aspect of the processing of the scan result signal, based on the provided information (and/or imaging system 5 operation may be controlled, at least in part, based on the provided information). This may include electronically steering the scanning signal or pulse, for example, or using the provided information to normalise the scan result signal, or supplementing the scan result signal with at least part of the provided information so that the analysis system 12 can normalise the scan result signal. Normalising the scan result signal, in this instance, means compensating for the change in the distance of the or each scanning device 111 from a ground surface or given horizontal plane, and/or an orientation of the or each scanning device 111 with respect to a ground surface or given horizontal plane. With respect to electronic steering, for example, note the swathes of emitted and reflected signals or pulses of the scanning devices in FIGS. 13 and 14.

Control System

As described, the crop scanning system 1 (e.g. the scanning head assembly 11) may include the control system 113.

The control system 113 may be communicatively coupled to other parts of the crop scanning system 1. These other parts may include, for example, one or more of the or each scanning device 111, the power supply 114, the one or more motors 11, the steering system 116, the imaging system 5, and/or the analysis system 12

The communicative coupling, if provided, to the or each scanning device 111, the steering system 116, the or each motor, the imaging system 5, and/or the analysis system 12 may be a wired or a wireless communicative coupling.

The communicative coupling to the power supply 114 may be a wired communicative coupling, for example.

The control system 113 may be configured to control one or more aspects of the operation of the crop scanning system 1 and, in particular, of the scanning head assembly 11.

For example, the control system 113 may be communicatively coupled to the or each scanning device 111 and may be configured to control the emission therefrom of a signal or pulse. The control system 13 may be configured to receive the scan data and may perform one or more pre-processing operations in relation thereto (e.g. before sending the scan data on to the analysis system 12).

In some embodiments, the control system 113 is configured to perform a Time Varying Gain (TVG) factor to the scan data (to take into account one or more of: variations in the moisture content of the ground (i.e. the soil), the type of material (i.e. soil) of the ground, and the density of the ground (i.e. soil)).

In some embodiments, the crop scanning system 1 is configured to perform a parameter test operation (to determine the impact of parameters such as the moisture content of the ground, the type of material, and the density of the ground). In particular, the or each scanning device 111 may be operated to perform a scanning process in relation to a known target object. The known target object may be an object of predetermined form. The known target object may be buried or partially buried in the soil and a scanning operation performed such that the known target object is captured within the scan data. The scan data associated with the known target object may be processed to determine one or more modifications of the scan data so that the scan data accurately represents one or more aspects of the known target object (such as a size of the target objection—which may be a width or a height, for example—see the size discussion in relation to the harvestable items, which applies equally here). The known target object may be buried to a predetermined depth, for example. This modification may then be applied by the control system 113 (scanning device 111 or analysis system 12) to the scan data prior to further processing of the scan data to identify one or more harvestable items.

The known target may be abject formed from a metal, or covered in a metal (at least partially), for example.

In some embodiments, the crop scanning system 1 may be configured to access predetermined parameter data rather than performing a test operation (or in addition thereto). The predetermined parameter data may include data relating to the moisture content of the ground, the type of material, and/or the density of the ground. The predetermined parameter data may be obtained, for example, from aerial or satellite scans of the region. In some embodiments, the predetermined parameter data is obtained, at least in part, from samples taken of the ground in the region and separate analysis of those samples.

The processes described herein as being performed on the scan data from the or each scanning device 111 may be performed at least in part by the scanning device 111, and/or the control system 13, and/or the analysis system 12.

The control system 113 may be configured to send scan data (pre-processed or otherwise) to the analysis system 12 in some embodiments.

The control system 113 may be configured to output one or more control signals to the one or more motors 115 and/or the steering mechanism 116 to control the operation (e.g. the direction and speed of movement) of the vehicle 2 and/or a self-propelled scanning head assembly 11.

The control system 113 may be communicatively coupled to the imaging system 5 and may be configured to control the capturing of images by the imaging system 5. The control system 113 may be configured to process image data generated by the imagining system 5—such as the application of one or more filters to the image data or other imaging processing operations.

The control system 113 may include, or may be communicatively coupled to, a control system location device 113*b* which may be configured to generate the geographical location information with which the scan data is associated (and the control system 113 may be configured to provide that association and may add the location information to the scan data).

The control system 113 may be configured to associate and may add the location information to the image data.

The control system location device 113*b* may be a satellite-based location system—such as the Global Positioning System (GPS), GLONASS, Galileo, NavIC and/or BeiDou systems, for example. The control system location device 113*b* may use real-time kinematic techniques to improve the accuracy of the geographic location information generated by the control system location device 113*b*. The control system location device 113*b* may include a differential satellite-based location system.

The geographic location information is associated with the scan and/or image data such that parts of the scan data and/or image data can be associated with specific geographical locations. This may be achieved in a number of different ways. For example, a set of scan data and/or image data relating to a given geographical area (such as a field or an area of a predetermined size and shape) may be associated with a single geographical location (relative to which further location information may be derived for the scan data and/or image data within the set). In other words, the single geographic location may be used as an origin of known geographical location (from the geographical information) and known position within the scan data and/or image data (e.g. a corner of the scan data and/or image data) to enable geographic location information to be derived in relation to other scan data and/or image data of the set. In some embodiments, the scan data and/or image data includes a plurality of frames of scan data and/or image data (each frame representing a still scan or image of a part of the crop, for example). Each frame may be associated with geographical location information. In some embodiments, the scan data and/or image data includes a plurality of pixels or voxels, wherein each pixel or vowel is associated with geographical location information.

In some embodiments, the geographic location information is location information relative to a known location within the scan data and/or image data. This may include, for example, a structure which is shown or otherwise represented within the scan data and/or image data. This structure may be a post, a beacon, or the like, and may be a structure within or adjacent the crop. As such, in some embodiments, the control system location device 113*b* may be configured to analyse the scan data and/or image data to identify the structure within the scan data and/or image data.

In some embodiments, the geographic location information associated with the scan data and/or image data is used (e.g. by the analysis system 12) to align the image data with the scan data—as both may be associated with geographical location information. In some embodiments, however, the alignment of the image data and the scan data may be achieved through the matching of patterns of data within the image data and the scan data. These patterns may be the positions, within the respective sets of data, of one or more plants forming the crop or of one or more other features within the image data and the scan data.

In some embodiments, the scan data and image data is associated with time information (e.g. by the control system 113) and, in particular, with time information from a common clock such that alignment of the image data and the scan data (e.g. by the analysis system 12) can be based on the time information. The common clock may be obtained using the satellite-based location system.

In some embodiments, the control system location device 113*b* may be provided as part of the or each scanning device 111 and/or imaging device 51, for example, instead of the control system 113.

The location information from the control system location device 113*b* may be used in the navigation of the vehicle 2 and/or the scanning head assembly 11, for example, in the case of a self-propelled scanning head assembly 11.

As described, the control system 113 may include the data storage module 113*a* which may be configured to store data representative of signals received by the or each scanning device 111.

Also as described, in some embodiments the control system 113 is not part of the scanning head assembly 11 but is part of the wider crop scanning system 1. In such embodiments, the control system 113 may be part of the analysis system 12. In some embodiments, the control system 113 may be carried by the mounting structure 112 and/or may be carried by the vehicle 2, or trailer or other attachment 24—in some such embodiments, the control system 113 is a distributed control system 113 with different parts provided in different locations.

The Power Supply

The power supply 114 may include a battery. The battery may be part of the scanning head assembly 11. In some embodiments, the battery is a battery of the vehicle 2. In some embodiments, the power supply 114 includes a vehicle power supply (i.e. a power supply of the vehicle 2 and configured to provide electrical power to one or more parts of the vehicle 2 and/or other devices coupled thereto). The power supply 114 may be a DC power supply with a voltage in the range of about 6V to about 24V. In some embodiments, the power supply 114 includes both a battery and a vehicle power supply.

The Analysis System

The analysis system 12 may, as described, include one or more processors 121 (configured to perform one or more operations on the scan data) and may be configured to receive the scan data from the control system 113 or from the data storage module 113a (as the case may be). The one or more processors 121 may be configured to generate the one or more analysis results associated with the scan data.

In embodiments in which the analysis system 12 is a remote system the analysis system 12 may include one or more servers 122 (of which the one or more processors 121 may be part) and this may be referred to as a so-called "cloud-based" system.

The or each server 122 may include or have access to data storage media 122a. The data storage media 122a may be configured to store instructions or execution by the or each processor 121 (of the or each server 122) to perform the operations described herein. The data storage media 122a may be configured to store scan data, and/or supplemental crop information, and/or analysis results (for use in or generation by the operations described herein).

The or each server 122 may further include memory for temporary storage of data in the performance of the operations described herein, along with one or more input/output interfaces 122b for communicating with other parts of the crop scanning system 1, for example.

The or each input/output interface 122b may include a network interface for wired or wireless communication. In some embodiments, the or each input/output interface 122b includes a network interface providing a communicative coupling to the Internet and the or each server 122 may be configured to communicate with at least one other part of the crop scanning system 1 over the Internet. This at least one other part may include, for example, the control system 113 and/or the user interface device 3 and/or the imaging vehicle 6.

The Internet is, as will be understood, one example of a wide-area-network, and other wide-area-networks might equally be used.

In some embodiments, the network interface is an interface to a local-area-network to provide communicative coupling to the at least one other part of the crop scanning system 1.

In some embodiments, a communicative coupling between the analysis system 12 and the at least one other part of the crop scanning system 1 is via both a wide-area-network and a local-area-network.

In some embodiments, the analysis system 12 is uniquely associated with a single scanning head assembly 11—i.e. configured to process scan data generated by one and only one scanning head assembly 11. In some embodiments, the analysis system 12 is associated with a plurality of scanning head assemblies 11—i.e. configured to process scan data generated by a plurality of different scanning head assemblies 11. The plurality of scanning head assemblies 11 may, for example, all have common ownership, and/or be associated with a single geographic region, and/or be owned by at least two different people or entities, and/or be spread across multiple geographic regions. In other words, in some embodiments, the same analysis system 12 may be used for processing scan data (independently or not) generated in relation to a plurality of different crops (which may (or may not) all be of the same plant or plant type, however (e.g. potatoes)).

The analysis system 12 may be configured to output the or each analysis result to an automated operation system 4 which may be configured to perform (or instruct the performance of) the one or more operations with respect to the crop (e.g. the application of fertiliser, pesticide, fungicide, water, and/or the like, the harvesting of the crop, the removal of foliage, a weeding operation, or similar). In some embodiments, the analysis result is further processed by the automated operation system 4 to determine the one or more operations to be performed but, in some embodiments, the analysis system 12 performs this further processing and outputs the result as part of the analysis result to the automated operation system 4 (e.g. as an instruction to perform the one or more operations). Indeed, in embodiments in which the analysis result is output to the user interface device 3 then this may, likewise, include direct instructions for the user to perform the one or more operations (with or without the use of the automated operation system 4, for example). Such a direct instruction may be, for example, an instruction to apply a fertiliser or pesticide to a particular part of the crop (and may include more specific details about the specific treatment to be applied to the crop such as the type, quantity, concentration, or the like).

The analysis system 12 may, therefore, be configured to receive scan data and may be configured to receive supplemental crop information (although in some embodiments, the analysis system 12 may process the image data to generate the supplemental crop information). This scan data and supplemental crop information may be associated with the same crop or part of a crop (e.g. a particular field). As such, both the scan data and the supplemental crop information may be associated with a particular geographic location and this geographic location (or an indicator representative thereof) may be provided within the scan data and/or supplemental crop information.

In some embodiments, the association of the scan data and/or supplemental crop information with a geographic location is, at least in part, general location information—such as a particular field or part of a field.

However, as described herein, in embodiments in which there is both scan data and supplemental crop information being used to generate the analysis result, both the scan data and supplemental crop information include geographic location information at a high resolution. For example, different parts of the scan data may be associated with different geographical locations and these locations may be less then 3 m, 2 m, 1 m, or 0.5 m apart. The same may be the case for the supplemental crop information—with different parts associated with different locations at the aforementioned resolution. The geographical location information may be longitude and latitude information, for example (i.e. global geographic location information) or may be location information relative to a predefined location such as a beacon (i.e. local geographic location information).

The manner in which the geographic location information is associated with the scan data and the supplemental crop information could take a number of different forms—i.e. the encoding of the geographic location information may be such that various parts of the data and information are provided with their geographic location or, for example, a single geographic location may be provided within the data or information along with relative locations for each part of the data or information based on that single geographic location. Many other examples are envisaged. In some embodiments, associated time information may be used instead of or in addition to associated geographical location information.

In any event, the scan data is associated with a first coordinate system for the geographical location information which it includes. The supplemental crop information is associated with a second coordinate system for the geographical information which it includes. The first and second coordinate systems may be the same coordinate system or may be different coordinate systems. If the two coordinate systems are different then one or both may be converted (e.g. by the analysis system 12) into a common coordinate system (e.g. using associated geographical location or time information, as described herein).

Accordingly, the scan data and the supplemental crop information may be analysed for particular geographical locations to generate analysis results for each such particular geographical location.

Of course, even when the two coordinate systems are the same or are converted into a common coordinate system, there may be a misalignment between the two sets of data (i.e. between the scan data and the supplemental crop information). Accordingly, in some embodiments, the analysis system 12, for example, may be configured to perform an alignment process to match one or more key features within the two sets of data and to adjust the location information associated with one or both sets of data to provide better alignment between the two so as to improve the analysis results.

In particular, looking at the analysis performed in more detail, the analysis system 12 may be configured to use the scan data to determine the location of objects within the volume to which the scan data relates. These objects include one or more harvestable items.

The location of the objects may include a geographic location and may include a depth location (i.e. a depth beneath the ground surface or a predetermined horizontal plane (which may be an approximate ground surface plane, for example).

The analysis system 12 may be configured to use the scan data to identify (for example, in addition to the location of the objects) a size of the objects.

In some embodiments, the size of the objects includes the size of the one or more harvestable items. The size may be for individual harvestable items but it may be that the scan data does not have sufficient resolution to distinguish between individual harvestable items (or other objects) which may be located in relatively close proximity to each other. Therefore, the size may be for a cluster of objects, which may be harvestable items.

The size may include a width or height. The width may be a maximum or average width of object or cluster of objects. The height may be a maximum or average height of object or cluster of objects. The average may be a mean, median, or modal value, for example.

In some embodiments, the analysis system 12 may be configured to fit a geometric shape to the object or cluster of objects represented by the scan data. This geometric shape may be a predetermined shape, the size and position of which is altered by the analysis system 12 to represent the object or cluster of objects. The size may, therefore, be a size of that geometric shape (e.g. a width and/or a height as described).

In some embodiments, the analysis system 12 may be configured to determine a volume of the object or cluster of objects represented by the scan data.

The analysis system 12 may be configured, for example, to use a lookup table (or similar index or a model) to determine an approximate volume of an object based on the width and/or height of the object.

The analysis system 12 may, therefore, be configured to generate, from the scan data, location and/or size information associated with objects represented by the scan data.

As mentioned, the objects will include one or more harvestable items. However, the objects likely also include other objects which are not harvestable items. These may include debris, other plants, stones/rocks, or other artefacts within the scan data. The non-harvestable items may include items formed from a plastics material or metal, for example.

The analysis system 12 may be configured to apply one or more filters based on the reflectivity of the objects within the scan data. Accordingly, one or more filters may be applied which remove from the scan data objects which have a reflectivity for the radar signal (for example) which is higher than a threshold maximum or lower than a threshold minimum. In other words, the scan data may be bandpass filtered based on the strength of the received reflected radar signal represented by the scan data (i.e. the data representative of signals received by the or each scanning device 111). Accordingly, items which do not reflect the signal strongly (such as those made of a plastics material) may be filtered from the scan data. Similarly, items which reflect more strongly than the harvestable items (such as those made of a metal) may also or alternatively be filtered from the scan data.

The analysis system 12 (additionally or alternatively) may be configured to apply one or more filters to the location and/or size information to exclude information relating to objects which are unlikely to be harvestable items.

The application of one or more filters may include the identification of objects which are in locations which are unlikely to be the locations of harvestable items. For example, the crop may have been planted in rows. Therefore, objects outside of a predetermined row volume (intended to encompass a single row) may be assessed as not a harvestable item. The scan data may include data relating to a plurality of rows and so there may be a plurality of predetermined row volumes associated with the scan data. The predetermined row volumes may be defined, for example, by the user identifying the likely location of one or more rows from the scan data or in terms of geographical locations. In some embodiments, the analysis system 12 may be configured to identify the one or more rows by identifying generally linear patterns of objects within the scan data.

In some embodiments, the analysis system 12 has access to the supplemental crop information. This supplemental crop information may include, for example, the likely location of plants of the crop within the image data. The analysis system 12 may be configured to use this supplemental crop information to determine the geographic location of one or more rows, and may then use this or these determined locations in the aforementioned filter. Rather than identify rows, the same information may be used to identify the likely location of harvestable items and to exclude objects which are unlikely to be harvestable items based on the likely location of plants of the crop, for example (which may be determined by identifying stem locations as described herein).

The application of one or more filters may include the identification of objects which have associated size information which is less than a predetermined threshold, or more than a predetermined threshold—such that the object is unlikely to be a harvestable item or cluster of harvestable items.

In some embodiments, the one or more filters include the use of additional scan data. The additional scan data may relate to the same geographical region as the scan data but may have been acquired at a different time. For example, the additional scan data may relate to a scanning operation which was performed (e.g. by the scanning head assembly 11) before the crop was planted. This additional scan information may, therefore, be subtracted from the scan data to remove data relating to objects which are common between the scan data and additional scan data. In some embodiments, additionally or alternatively, a scanning operation may be performed immediately after the planting of the crop and this may then be compared to subsequent scan results (i.e. scan data from subsequent scanning operations) to identify changes which are likely, therefore, to be the growth of the harvestable item(s).

The analysis system 12 may, therefore, have processed the scan data to identify what is likely to be the location and/or size of one or more harvestable items represented by the scan data This may then be output as the analysis result or as a part thereof and is indicative of the likely total size or volume of the crop (i.e. of the harvestable items).

However, the analysis system 12 may be configured to use the supplemental crop information to provide additional information about the or each harvestable item.

In particular the supplemental crop information may include information regarding the number harvestable items at each location (e.g. as derived from counting the number of stems, as described herein). The analysis system 12 may have generated information about the size and/or location of the one or more harvestable items but that size and/or location may relate to a cluster of harvestable items.

The analysis system 12 may be configured to use the size information to determine a likely size of the or each harvestable item identified from the scan data. In other words, the analysis system 12 may be configured to combine information derived from both the scan data and the image data to determine a likely size of the harvestable item(s) which are represented in the scan data.

This may be achieved, for example, by dividing a volume of a harvestable item or cluster identified using the scan data, by the number of harvestable items identified using the image data. This may provide an approximation (e.g. an average, such as a mean) volume of each harvestable represented by the scan data.

In some embodiments, the image data is processed—see herein—to provide an indirect indication of the number of harvestable items. This may include, for example, a foliage volume, a leaf size, or other information obtained from the image data regarding the plants.

The geographic location information with which the image data is associated (which may be included in the image data) may be used along with the geographic location information with which the scan data is associated (which may be included in the scan data) to align the two datasets. In some embodiments, pattern matching may be used to align the two datasets and/or to adjust the alignment of the two datasets.

In some embodiments, the scan data includes above ground information and below ground information—i.e. scan data relating to objects above a ground surface and scan data relating to objects below a ground surface. The analysis system 12 may perform analysis on the above ground information and/or the below ground information to distinguish between individual plants. For example there may be a change in foliage canopy height or a cluster of below ground objects, which may enable plants to be distinguished. This may be used to help align the scan data with the image data, and/or to filter the scan data for further processing. In the case of filtering, there may be a categorisation process performed by the analysis system 12 on data of the scan data which is identified as belonging to an individual plant—to determine if that aforementioned determining step is correct or whether that scan data relates to another object.

In some embodiments, a canopy height may be determined based on the above ground information from the scan data, the ranging sensor, and/or the imaging data, this may be used to filter the scan data to remove the influence of the canopy from the remaining scan data for subsequent processing.

Figure 25:
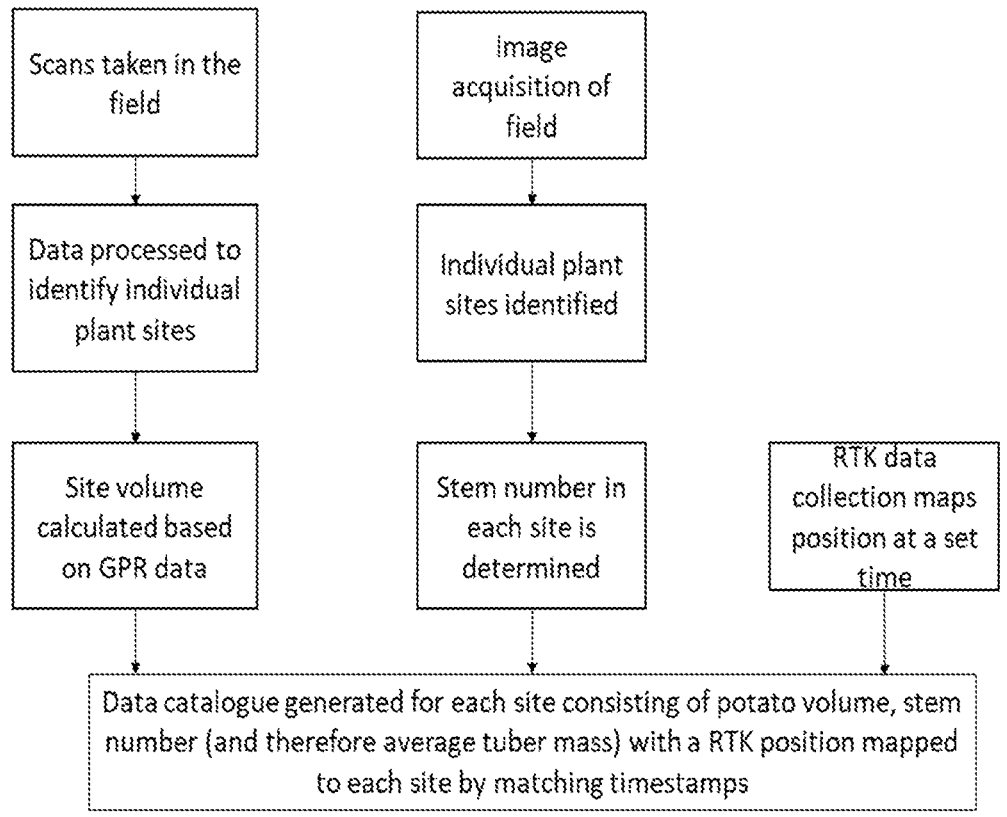
FIG. 25 is a flowchart of an operation of some embodiments.
Figure 26:
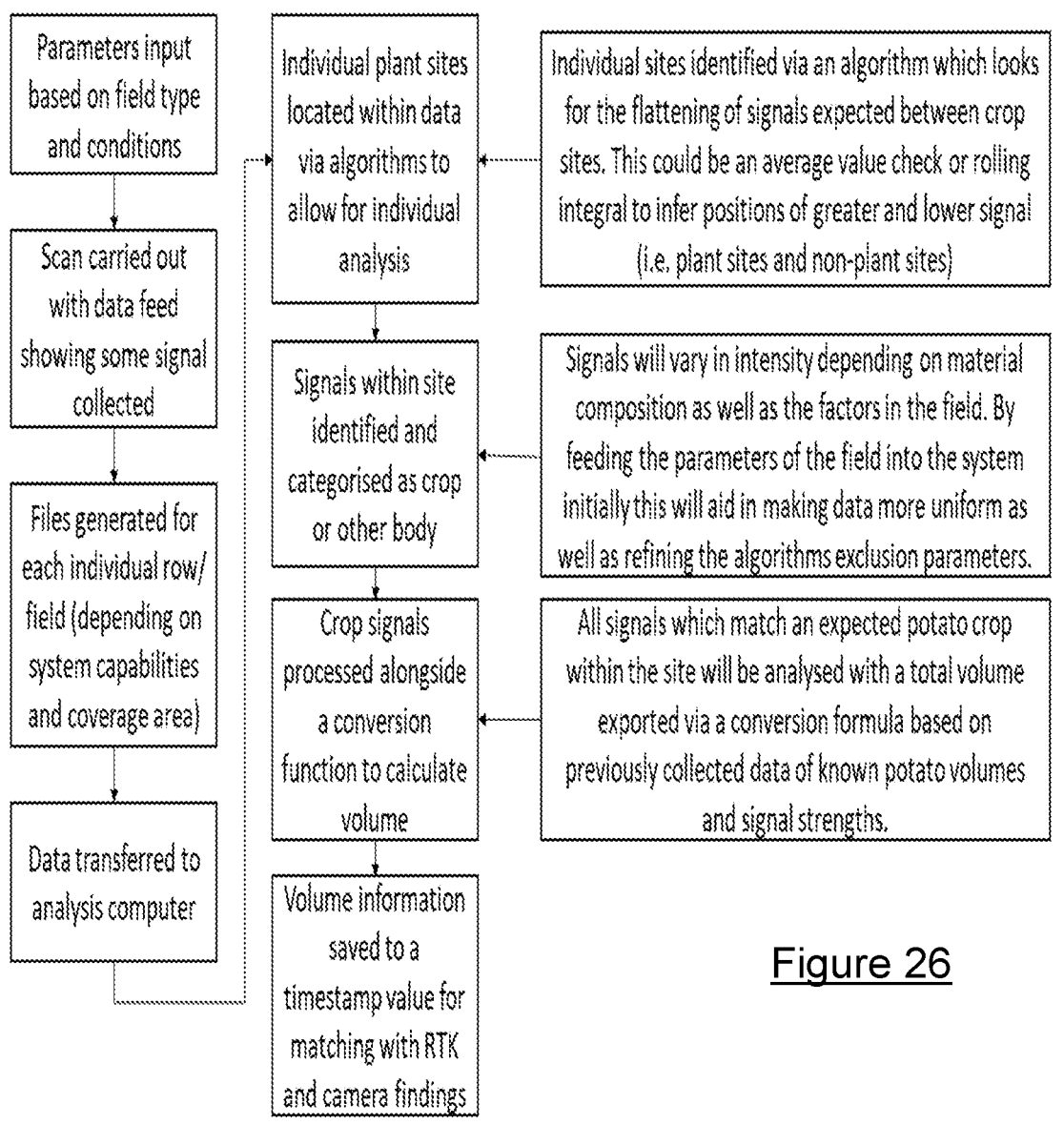
FIG. 26 is a flowchart of scanning and analysis operations (not including the use of the image data) of some embodiments.

FIG. 25 provides a flow diagram demonstrating the collection and analysis of the scan data according to some embodiments. This includes analysis steps which are performed by the analysis system 12. As will be understood, this example uses a common time, but this need not be the case The analysis result may, therefore, include size information for the or each harvestable item. The analysis result may include size information associated with a plurality of harvestable items and may include location information for those harvestable items.

This information may be output and presented in a number of different ways to a user using a user interface, for example, or may be used (as described) in the performance of one or more activities in relation to the crop.

Imaging System

The imaging system 5 could take a number of different forms in accordance with various embodiments described herein. In some embodiments, the imaging system 5 includes the one or more imaging devices 51, with the or each imaging device 51 including a visible light camera 51a.

The visible light camera 51a may be configured to capture an image of a crop or a part thereof and to output image data and this image data may be (or may be included in) the supplemental crop information, for example. The image data may represent one or more images of the crop or a part thereof in a standard colour data format (e.g. red-green-blue). The visible light camera 51a may, therefore, be configured to capture an image by capturing red, green, and blue image data for the crop or the part thereof. In some embodiments, however, the visible light camera 51a may be configured to capture only one or more of the red, green, and blue light components—such as just (i.e. only) the blue component. As such, in some such embodiments, the image data may comprise a blue light image of the crop or a part thereof.

In some embodiments, the image data may be pre-processed by a processor 51*d* of the imaging system 5. This pre-processing may include, for example, removal (i.e. filtering) of at least part of the image data (such as one or more of the colour components thereof, such as the red and green components)—and this may leave the image data including only the blue light component, for example. In some embodiments, however, other light components are retained (in addition to or instead of the blue light component).

In some embodiments, the or each imaging device 51 may include one or more cameras 51*b* (in addition to or instead of the visible light camera 51*a*) which may be configured to capture image data for the crop or a part of the crop which is outside of the normal visible light spectrum—for example ultraviolet or infrared light.

In some embodiments, therefore, the image data may include image data outside of the normal visible light spectrum (in addition to or instead of the image data in the visible light spectrum).

Various different examples of imaging device may be used as the one or more imaging devices 51. For example, the or each imaging device 51 may include the camera of a DJI Mavic Air vehicle or the DJI Inspire vehicle, sold by SZ DJI Technology Co., Ltd, of Shenzhen, China. In some embodiments the or each imaging device 51 may include a Survey 3 camera by Mapir, Inc. of California, USA. In some embodiments, the or each imaging device 51 may include a Multispectral Snapshot camera sold by Spectral Devices Inc., of Ontario, Canada.

The imaging system 5 may be carried by a vehicle. That vehicle may be a vehicle 2 as generally described herein or may be a different vehicle or different type of vehicle. For example, the imaging system 5 may be carried by the air vehicle 6 (which may be unmanned, as described). Suitable vehicles to carry the imaging system 5 are described herein in relation to an imaging vehicle 6.

The imaging system 5 may include, or may be communicatively coupled to, an imaging system location device 51*c* which may be configured to generate the geographical location information with which the image data (which may be the supplemental crop information as described herein) is associated.

The imaging system location device 51*c* may be a satellite-based location system—such as the Global Positioning System (GPS), GLONASS, Galileo, NavIC and/or BeiDou systems, for example. The imaging system location device 51*c* may use realtime kinematic techniques to improve the accuracy of the geographic location information generated by the imaging system location device 51*c*. The imaging system location device 51*c* may include a differential satellite-based location system.

The geographic location information is associated with the image data such that parts of the image data can be associated with specific geographical locations. This may be achieved in a number of different ways. For example, a set of image data relating to a given geographical area (such as a field or an area of a predetermined size and shape) may be associated with a single geographical location (relative to which further location information may be derived for the image data within the set). In other words, the single geographic location may be used as an origin of known geographical location (from the geographical information) and known position within the image data (e.g. a corner of the image data) to enable geographic location information to be derived in relation to other image data of the set. In some embodiments, the image data includes a plurality of frames of image data (each frame representing a still image of a part of the crop, for example). Each frame may be associated with geographical location information. In some embodiments, the image data includes a plurality of pixels or voxels, wherein each pixel or voxel is associated with geographical location information.

In some embodiments, the geographic location information is location information relative to a known location within the image data. This may include, for example, a structure which is shown or otherwise represented within the image data. This structure may be a post, a beacon, or the like, and may be a structure within or adjacent the crop. As such, in some embodiments, the imaging system location device 51*c* may be configured to analyse the image data to identify the structure within the image data. In some embodiments, there is no imaging system location device 51*c* and the analysis of the image data is performed by the processor 51*d* which is configured to perform this analysis.

In some embodiments, the geographic location information associated with the image data is used (e.g. by the analysis system 12) to align the image data with the scan data—as both may be associated with geographical location information. In some embodiments, however, the alignment of the image data and the scan data may be achieved through the matching of patterns of data within the image data and the scan data. These patterns may be the positions, within the respective sets of data, of one or more plants forming the crop or of one or more other features within the image data and the scan data.

The imaging system 5 may be configured to process the image data (using the processor 51*d*, for example). In some embodiments, the imaging system 5 may be configured to transmit or otherwise send the image data to the analysis system 12, which may be configured to process the image data. In some embodiments, the processor 51*d* may pre-process the image data and this pre-processed image data may then be transmitted or otherwise sent to the analysis system 12.

The processing of the image data may include determining an image intensity for a plurality of parts of the image data. This image intensity may be determined for a particular light frequency or frequency range (such as the visible blue light frequency range (e.g. about 610-670 THz). Each part of the image data may be an individual pixel or voxel of the image data, for example. In some embodiments, each part of the image may be a group of pixels or voxels. In some embodiments, the image data is segmented in a regular, uniform, pattern into the groups of pixels or voxels to form the parts of the image data.

The or each part of the image data may then be processed to identify parts which are likely to contain a stem of the plant(s) forming the crop.

This processing may include, for example, identifying the range of image intensities of the parts of the image data across the entire image data. The processing may include identifying a first proportion of the range of image intensities and classifying parts of the image data which are within the first proportion of the range of image intensities as not being image data of stems. The processing may include, for example, identifying a second proportion of the range of image intensities and classifying parts of the image data within the second proportion of the range of image intensities as being image data of stems.

This may result in, for example a first group of parts of the image data which are identified as not being image data of stems and a second group of parts of the image data which are identified as being image data of stems.

The second group of parts of the image data may then be processed to identify clusters of parts of the image data likely relating to the same stem, and to identify groups of stems which likely relate to stems of the same plant. The processing may, therefore, be include outputting a count of the number of stems associated with each plant.

In some embodiments, the processing may include manipulating the image data to provide a range of image intensities to enable differentiation of stems and non-stems within the image data, wherein the differentiation includes the calculation of pixel-wise differences between blue light band and red light band image intensities, and pixel-wise differences between blue light band and green light band image intensities. The process may include using each pair of differences as a point coordinate pair, and calculating an Euclidian norm or Manhattan distance of the coordinate pair from the origin of a Cartesian plane as the final intensity of the pixel which distinguishes stems from non-stems within the image data.

The process may further include clustering the pixel-wise image data by grouping into singular units based on their Euclidian distances from each other, with a benchmark distance set based on an average size of presumptive stem units in the image data.

As the image data may be associated with geographic location information, the processing of the image data may include the outputting of the geographic location of each plant, along with the number of stems associated with each plant.

It has been shown that the number of stems of a plant such as a root vegetable (e.g. a potato) correlates to the number of harvestable items for that plant (e.g. the number of tubers, such as the number of potatoes)—see Allen, E. J., Wurr, D. C. E. A comparison of two methods of recording stem densities in the potato crop. Potato Res 16, 10-19 (1973), for example.

The imaging system 5 (or the analysis system 12, if the analysis system 12 is processing the image data) may have stored thereon—e.g. on a computer readable medium of the imaging system 5 or the data storage media 122a of the analysis system 12—an index or model which matches the number of stems to the likely number of harvestable items (e.g. potatoes) for a particular crop. The index or model may be specific for a particular type of crop (such as potatoes, sweet potatoes, carrots, or the like) or may be specific to a particular variety of a particular type of crop (e.g. Maris Piper, Rooster, Salad Blue, or the like, for potatoes).

The index or model may have been generated based on prior experimental analysis in which the number of stems were counted (e.g. using the aforementioned process(es) or manually) and then the harvestable items harvested and counted. The index or model may be a linear regression model.

The index or model may be specific to a particular growing location—such as a particular country, region, field, or the like. The index or model may be specific to particular growing conditions—such as a particular soil type, climate, or the like. The index or model may be specific to a particular type of harvestable item (such as a potato variety).

In some embodiments, the imaging system 5 (of the analysis system 12, as the case may be) may have stored thereon a plurality of such indices (or models). The most appropriate index or model for a particular crop may be automatically selected—e.g. based on geographical location information from the image data—and/or may be manually selected by a user via the user interface device 3.

Accordingly, the number of stems may be converted, using the index or model, into a number of harvestable items. The number of harvestable items may be grouped, e.g. into the harvestable items relating to a single plant. The harvestable items may be associated with geographical location information (from the geographical location information associated with the image data) and this association may be for each harvestable item or for each group of harvestable items, for example.

The indices (or models) may, in some embodiments, provide a correlation between other plant parameters (such as a foliage volume, a leaf size, or other information obtained from the image data regarding the plants) and the number of harvestable items. Such an index or model may be generated from experimental results and may be crop specific.

The supplemental crop information may include the results of the aforementioned processing and may, therefore, include one or more of: the image data, the number of stems associated with each plant and the location of each plant, the number of harvestable items and the location of each group of harvestable items, the number of harvestable items and the location of each harvestable item.

As will be appreciated, therefore, the supplemental crop information may be at least partially generated by the analysis system 12 and/or by the imaging system 5.

The Imaging Vehicle

As described, the imaging system 5 may be carried by the vehicle 2 or another type of vehicle such as the air vehicle 6.

The vehicle which carries the imaging system 5, whether or not it is the same as the vehicle 2 described herein, may be generally referred to as the imaging vehicle 6. The imaging vehicle 6 may be the air vehicle 6 as described.

The imaging vehicle 6 may be an autonomous vehicle which is configured to navigate and travel without substantive user input. A user may, for example, via a suitable user interface, instruct the imaging vehicle 6 of an area to be imaged and the imaging vehicle 6 may be configured to plan a course in order to image that area. In other embodiments, the use may (using the suitable user interface, for example) provide the course which the imaging vehicle 6 then navigates along to complete the imaging of that area. In still other embodiments, the suitable user interface may be used to control the movements of the imaging vehicle 6 in substantially realtime to control the movements of the imaging vehicle 6 to perform the imaging of that area. The suitable user interface may be a user interface provided on a mobile computing device such as a mobile (i.e. cellular) telephone (which may be a smartphone), or a tablet computing device, for example. The user interface may be provided as a remote control device for the imaging vehicle 6.

In some embodiments, the imaging vehicle 6 may be an air vehicle 6 and one example air vehicle is the DJI Mavic Air or the DJI Inspire vehicle, by SZ DJI Technology Co., Ltd, of Shenzhen, China.

The air vehicle 6 may be an electrically powered rotorcraft, for example, and may be a quadcopter. In some embodiments, the air vehicle 6 may be a fixed wing vehicle.

In some embodiments, the imaging vehicle 6 includes one or more ground engaging wheels or tracks, and is a ground-based vehicle rather than an air vehicle 6.

In some embodiments, the imaging vehicle 6 is the same as the vehicle 2 or is, at least, of the same type and/or construction. So, for example, the imaging vehicle 6 may be a tractor. In some embodiments, the imaging vehicle 6 is towed by another vehicle (which may be a vehicle 2 as described herein).

In some embodiments, the primary purpose of the imaging vehicle 6 is not for use in performance of an imaging operation (using the imaging system 5) but is, for example, for an operation in relation to the crop such as the spraying of fertiliser, pesticide, fungicide, or water, or for cutting the crop or other foliage, for example.

The Vehicle, or Trailer or Other Attachment

As described the vehicle 2 may be a self-propelled vehicle 2 such as a tractor, an all-terrain vehicle (ATV) (such as a quad bike, or a three-wheeler, for example), or a truck.

The vehicle 2 may include one or more ground engaging wheels, tracks, or skids, for example. In some embodiments, movement of the vehicle 2 is driven by a motor—which may be an electric motor or an internal combustion engine. As described, even in embodiments in which the movement of the vehicle 2 is driven by an electric motor, an internal combustion engine may be provided to generate electricity for use by the electric motor (i.e. a hybrid configuration). The motor may be configured, for example, to drive rotation of a ground engaging wheel or a track.

As will be understood, therefore, the vehicle 2 may be a farm vehicle. In some embodiments, the vehicle 2 could take a less conventional form of farm vehicle and may be a hovercraft or airborne vehicle, for example.

The vehicle 2 may be driven by a human operator (who may be located on/in the vehicle 2 or who may be remote from the vehicle 2) or may be driven by an automated driving system (which maybe configured to control the operation, or aspects of the operation of the vehicle 2 such as navigation, without substantive human intervention).

In some embodiments, the vehicle 2 includes no means for propulsion itself but is in the form of a trolley or sled, which may be pushed or pulled manually.

The vehicle 2 may include one or more structures for the attachment of additional equipment. This additional equipment may include typical farm equipment, for example, such as sprayers, ploughs, harvesting or cutting equipment, and the like. Such structures are typically of a standardised form—to enable interchangeable attachment of multiple different types of additional equipment to the same structure. The structure may include a three point linkage (i.e. three point hitch), for example. The or each structure may include connections for electrical power, hydraulic power, (electrical or hydraulic) communication, and (electrical or hydraulic) control. The trailer or other attachment 24 is an example of just such additional equipment.

As described the mounting structure 112 is configured to be secured to the vehicle 2 (or trailer or other attachment 24). The mounting structure 112 (e.g. the framework 112a) may, therefore, include one or more vehicle attachment points 112c configured for use in securing the mounting structure 112 to the vehicle 2 (or trailer or other attachment 24). As such, the one or more structures for the attachment of additional equipment to the vehicle 2 may include one or more mounting locations on the vehicle 2 which correspond with the one or more vehicle attachment points 112c. The or each such mounting location may be referred to as a head assembly mounting location 25, for example, and may be configured to be secured to a respective one of the one or more vehicle attachment points 112c of the mounting structure 112. As described, the or each head assembly mounting location 25 may be in the form of an aperture defined by a part of the vehicle 2 and configured to receive at least part of a bolt (to enable a nut and bolt attachment of the mounting structure 112 to the vehicle 2).

Also as described, however, other forms of attachment of the mounting structure 112 to the vehicle 2 (or trailer or other attachment 24) are also envisaged—e.g. welding, riveting, adhering, or the like.

It will be understood that whilst the head assembly mounting locations 25 are described as locations, they may include one or more respective features to enable the securing/mounting of the mounting structure 112 to the vehicle 2—such as apertures, ridges, recesses, protrusions, threaded parts, and the like.

As described, the mounting structure 112 may, additionally or alternatively, be configured to be secured to the trailer or an other attachment 24 for the vehicle 2. The trailer or other attachment 24 may be removable from the vehicle 2 (i.e. may not be an integral part of the vehicle 2). As such, the mounting structure 112 may be configured to be mounted directly to a vehicle 2 or indirectly to the vehicle 2 (via a trailer or other attachment 24).

The trailer or other attachment 24 may include one or more ground engaging wheels, tracks or skids, for example. The trailer or other attachment 24 may be configured to be secured to the vehicle 2 using the one or more structures (as described herein) for the attachment of additional equipment to the vehicle 2, for example.

The description in relation to the or each head assembly mounting location 25 applies equally to the trailer or other attachment 24. In other words, the trailer or other attachment 24 may include the or each head assembly mounting location 25, in some embodiments.

The trailer or other attachment 24 (or the vehicle 2) may be configured to perform one or more other operations in relation to the crop. The or each other operation may include a spraying operation (e.g. spraying water, fertiliser, pesticide, or fungicide), a cutting operation (e.g. to cut foliage associated with the crop, which may include foliage of plants forming the crop and/or of weeds or other plants in the vicinity of the crop), a scanning operation (e.g. a visual inspection of the crop), a harvesting operation, or the like. As described, in some embodiments, the trailer or other attachment 24 includes a crop treatment system (such as a sprayer) which may include a boom which is configured to extend across multiple rows of the crop or, at least, is configured such that the boom extends across a width of the crop which is greater than a width of the vehicle 2. The boom may extend across a plurality of rows of the crop (such that the imaging system 5, if provided on the boom, and/or the or each scanning device 111, if provided on the boom, may perform their respective operations on more than one row of the crop simultaneously, e.g. as the vehicle 2, trailer or other attachment 24, moves along the rows).

Overview and Processes

As will be understood based on the description herein of the various parts and operations of the component parts of the crop scanning system 1.

In summary, therefore, a scanning operation may be performed in relation to a region (e.g. a field) prior to the planting of the crop. This may then provide a baseline to aid—as described—in the identification of one or more harvestable objects from later generated scan data. The scanning operation is performed by the one or more scanning devices 111 being moved across the region. This may be achieved by movement of the scanning head assembly 11 across the region. The scan data generated may be sent to the analysis system 12 for storage, for example.

This initial scan data may be processed by the analysis system 12 to identify objects—which may be artefacts for subsequent removal from scan data generated at a later time.

The crop may then be planted. In some embodiments, the crop may be planted in rows, for example.

In some embodiments, a further scan operation may be performed in relation to a region (e.g. a field) after the planting of the crop. This may then provide a further baseline to aid—as described—in the identification of one or more harvestable objects from later generated scan data. Again, the scanning operation is performed by the one or more scanning devices 111 being moved across the region. Still again, this may be achieved by movement of the scanning head assembly 11 across the region. The scan data generated may be sent to the analysis system 12 for storage, for example.

This post-planting scan data may be processed by the analysis system 12 to identify objects—which may be artefacts for subsequent removal from scan data generated at a later time.

At this point, the crop has likely not yet grown and may no shoots may be visible above the ground surface. The crop may be left until initial shoots are visible above the ground surface across all (or substantially all) of the region.

An imaging operation is then performed using the imaging system 5. The imaging system 5 may capture images of all, substantially all, or part of the crop including the shoots. The image data may then be processed as described and this may be performed by the imaging system 5 and/or by the analysis system 12—so in some embodiments, the image data as generated or in a pre-processed form may be sent to the analysis system 12.

The processing of the imaging data generates information as described regarding the number of stems and so the likely number of harvestable items, along with location information. This information is then stored (e.g. using the analysis system 12).

The imaging operation may be performed whilst the shoots, i.e. the stems, are still relatively young as it has been determined that young stems are more readily identifiable and are more likely to represent main stems of the plant (rather than branched stems above ground—which may not be indicative of the number of harvestable items).

In some embodiments, the imaging operation may be performed at the same time as the or each scanning operation (each scanning operation may be associated with a correspondingly timed imaging operation). Indeed, the same vehicle 2 may be used for both the scanning and the imaging operation and so both may be performed substantially simultaneously.

The scanning and/or imaging operations may be performed periodically.

In relation to, for example, potatoes the imaging (and/or scanning) operation may performed every 1-14 days or every 2-7 days, or every 3-4 days.

Scanning operations which are performed other than to obtain a baseline may be referred to as main scanning operations (to distinguish this scanning operation from the pre-planting and the post-planting scanning operations described above).

A main scanning operation may be performed in much the same manner as the pre-planting scanning operation and generates scan data as described.

The scan data may be sent, for example, to the analysis system 12 for processing (and/or some processing may have occurred in the control system 113 as described). The scan data may be processed using the scan data from the pre-planting and/or post-planting scans in order to aid in removal of potential artefacts from the scan data relating to the main scanning operation.

As described, the scan data may be processed to identify one or more harvestable items or clusters thereof. This may include the identification of size information for the harvestable item(s) or clusters thereof and this may be associated with location information.

In some embodiments, the total volume of all harvestable items identified (in clusters or otherwise) may be output to provide an indication of a total crop yield.

In some embodiments, the processing of the scan data (e.g. by the analysis system 12) further includes using the image data in combination with the scan data to determine the likely number of harvestable items and this may include the likely number of harvestable items at various locations within the region.

The processing may, therefore, further include the combination of the number of harvestable items and volume of the harvestable items to determine the likely size of the or each harvestable item.

With reference to FIG. 25, some embodiments (including that represented in this figure) may include the capturing of scan and image data at the same time, and the association of the time information with position data (in this case Real-Time Kinematic (RTK) data). As can be seen from this flow diagram, scan and image data is collected and then processed to generate a data set (i.e. data catalogue) for that site.

The results of the processing may be output for display on the user interface device 3 and/or may be used to generate commands to the automated operation system 4.

As will be understood, the provision of information about the size of the harvestable items may be used to control the size (e.g. through adjustments to one or more operations performed on the crop) to provide harvestable items of a desired size. This may help to, for example, reduce waste. The information may also be used to identify ideal growing conditions for particular crops. This, again, may help to reduce waste of crop treatments (such as fertiliser, for example).

An output from the analysis system 12 may be in the form of a heat map which is a representation of the geographical region to which the scan and image data relates (e.g. a field) on which is overlaid information about the number and/or size of harvestable items throughout the region (e.g. represented by different colours or shades).

The analysis system 12 may be provided independently of the other parts of the system, for example.

Embodiments include computer programs (e.g. instructions stored on one or more computer readable media) which—when executed by one or more processor(s)—cause the processing operations described herein in relation to the data sets generated (e.g. the image data and the scan data).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A crop scanning system for determining a parameter associated with a plurality of harvestable items of a crop, the harvestable items being beneath a ground surface, the crop scanning system including:

a scanning head assembly including at least one scanning device configured to perform a scanning operation in relation to the harvestable items, the scanning device being configured to emit a ground penetrating radar signal or pulse and to generate scan data including a representation of the harvestable items;

an imaging system configured to capture an image of a part of the crop which is above the ground surface and to generate image data including a representation of one or more stems and/or meristems associated with the harvestable items; and an analysis system configured to use the scan data and the image data to determine the parameter associated with the harvestable items, wherein the at least one parameter includes a predicted size of the harvestable items, wherein use of the scan data and the image data includes use of the image data to determine a number of stems and/or meristems associated with the harvestable items, and use of the number of stems and/or meristems to determine the number of harvestable items.

2. The system according to claim 1, wherein:

the use of the scan data and the image data includes use of the scan data to determine a total size for the harvestable items.

3. The system according to claim 1, wherein:

use of the image data to determine a number of stems and/or meristems is use of the image data to determine a number of meristems.

4. The system according to claim 1, wherein:

the use of the scan data and the image data includes use of the scan data to determine a total size for the harvestable items, and wherein the analysis system is further configured to divide the total size for the harvestable items by the number of harvestable items to generate the predicted size of the harvestable items.

5. The system according to claim 1, wherein:

the imaging system includes one or more imaging devices, and at least one of at least one of the one or more imaging devices includes a visible light camera.

6. The system according to claim 1, wherein:

the analysis system is configured to use image data in the form of a blue light image of the part of the crop.

7. The system according to claim 1, wherein:

the scanning head assembly is mounted to a vehicle which has one or more ground engaging wheels, tracks, or skids.

8. The system according to claim 1, wherein:

the imaging system and scanning head assembly are carried by the same vehicle.

9. A crop scanning method for determining a parameter associated with a plurality of harvestable items of a crop, the harvestable items being beneath a ground surface, the crop scanning method including:

performing a scanning operation in relation to the harvestable items, including emitting a ground penetrating radar signal or pulse and generating scan data including a representation of the harvestable items;

receiving an image of a part of the crop which is above the ground surface and generating image data including a representation of one or more stems and/or meristems associated with the harvestable items; and using the scan data and the image data to determine the parameter associated with the harvestable items, wherein the at least one parameter includes a predicted size of the harvestable items, wherein use of the scan data and the image data includes use of the image data to determine a number of stems and/or meristems associated with the harvestable items, and use of the number of stems and/or meristems to determine the number of harvestable items.

10. The method according to claim 9, wherein:

the use of the scan data and the image data includes use of the scan data to determine a total size for the harvestable items.

11. The method according to claim 9, wherein:

use of the image data to determine a number of stems and/or meristems is use of the image data to determine a number of meristems.

12. The method according to claim 9, wherein:

the use of the scan data and the image data includes use of the scan data to determine a total size for the harvestable items, and wherein determining the parameter further includes dividing the total size for the harvestable items by the number of harvestable items to generate the predicted size of the harvestable items.

13. The method according to claim 9, wherein:

the image data is visible light image data.

14. The method according to claim 9, wherein:

use of the scan data and image data includes use of the image data in the form of a blue light image of the part of the crop.

15. The method according to claim 9, wherein:

the image data is generated at substantially the same time as the scan data.

16. The method according to claim 9, further including:

mounting a scanning head assembly to a vehicle which has one or more ground engaging wheels, tracks, or skids, wherein the scanning head assembly is configured to perform the scanning operation.

17. The method according to claim 9, further including:

providing an imaging system to capture the image data and a scanning head assembly for performing the scanning operation, wherein the imaging system and the scanning head assembly are carried by the same vehicle.

18. A non-transitory computer readable medium having stored thereon instructions which, when executed by a processor, cause the operation of a method including:

performing a scanning operation in relation to the harvestable items, including emitting a ground penetrating radar signal or pulse and generating scan data including a representation of the harvestable items;

receiving an image of a part of the crop which is above the ground surface and generating image data including a representation of one or more stems and/or meristems associated with the harvestable items; and using the scan data and the image data to determine the parameter associated with the harvestable items, wherein the at least one parameter includes a predicted size of the harvestable items, wherein use of the scan data and the image data includes use of the image data to determine a number of stems and/or meristems associated with the harvestable items, and use of the number of stems and/or meristems to determine the number of harvestable items.

* * * * *